US008665403B2

(12) United States Patent
Yamazaki et al.

(10) Patent No.: US 8,665,403 B2
(45) Date of Patent: Mar. 4, 2014

(54) LIQUID CRYSTAL DISPLAY DEVICE

(75) Inventors: Shunpei Yamazaki, Tokyo (JP); Yoshiharu Hirakata, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 296 days.

(21) Appl. No.: 13/108,229

(22) Filed: May 16, 2011

(65) Prior Publication Data
US 2011/0285943 A1 Nov. 24, 2011

(30) Foreign Application Priority Data
May 21, 2010 (JP) .................. 2010-117511

(51) Int. Cl.
*G02F 1/1335* (2006.01)
(52) U.S. Cl.
USPC .......................... 349/114; 349/113
(58) Field of Classification Search
USPC ................. 349/113–114
See application file for complete search history.

(56) References Cited

U.S. PATENT DOCUMENTS

| 5,731,856 | A | 3/1998 | Kim et al. |
|---|---|---|---|
| 5,744,864 | A | 4/1998 | Cillessen et al. |
| 6,181,396 | B1 * | 1/2001 | Kanoh et al. ............... 349/113 |
| 6,294,274 | B1 | 9/2001 | Kawazoe et al. |
| 6,563,174 | B2 | 5/2003 | Kawasaki et al. |
| 6,690,437 | B2 | 2/2004 | Yamazaki et al. |
| 6,727,522 | B1 | 4/2004 | Kawasaki et al. |
| 6,747,288 | B2 | 6/2004 | Yamazaki et al. |
| 6,747,289 | B2 | 6/2004 | Yamazaki et al. |
| 6,855,957 | B1 | 2/2005 | Yamazaki et al. |
| 6,882,388 | B2 | 4/2005 | Sugiura et al. |
| 7,049,190 | B2 | 5/2006 | Takeda et al. |
| 7,053,969 | B2 | 5/2006 | Yamazaki et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al |
| 7,212,265 | B2 | 5/2007 | Eguchi et al. |
| 7,282,782 | B2 | 10/2007 | Hoffman et al. |
| 7,297,977 | B2 | 11/2007 | Hoffman et al. |

(Continued)

FOREIGN PATENT DOCUMENTS

| EP | 1 737 044 A1 | 12/2006 |
|---|---|---|
| EP | 2 226 847 A2 | 9/2010 |

(Continued)

OTHER PUBLICATIONS

English Translation of Nakamura JP2000193964—Jul. 14, 2000.*

(Continued)

*Primary Examiner* — Phu Vu
(74) *Attorney, Agent, or Firm* — Fish & Richardson P.C.

(57) ABSTRACT

Reflection efficiency of reflected light is improved and white display is efficiently performed in a liquid crystal display device which performs display by reflecting incident external light. A liquid crystal display device with higher visibility and higher image quality is provided. White display is performed utilizing reflected light which is efficiently scattered with the use of a pixel electrode layer whose surface has depressions and projections, whereby reflection efficiency of the reflected light can be improved and white display can be efficiently performed. Further, a liquid crystal display device with higher visibility and higher image quality can be provided.

28 Claims, 18 Drawing Sheets

(56) References Cited

U.S. PATENT DOCUMENTS

| | | |
|---|---|---|
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,480,019 B2 | 1/2009 | Itami et al. |
| 7,501,293 B2 | 3/2009 | Ito et al. |
| 7,525,614 B2 | 4/2009 | Jeong et al. |
| 7,612,849 B2 | 11/2009 | Eguchi et al. |
| 7,674,650 B2 | 3/2010 | Akimoto et al. |
| 7,732,819 B2 | 6/2010 | Akimoto et al. |
| 7,821,613 B2 | 10/2010 | Kimura |
| 7,903,210 B2 | 3/2011 | Sugiura et al. |
| 7,973,893 B2 | 7/2011 | Itami et al. |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2002/0140886 A1* | 10/2002 | Sugiura et al. ............ 349/113 |
| 2003/0007113 A1* | 1/2003 | Yamanaka et al. ......... 349/113 |
| 2003/0189401 A1 | 10/2003 | Kido et al. |
| 2003/0218222 A1 | 11/2003 | Wagner et al. |
| 2004/0038446 A1 | 2/2004 | Takeda et al. |
| 2004/0127038 A1 | 7/2004 | Carcia et al. |
| 2004/0144754 A1 | 7/2004 | Itami et al. |
| 2005/0017302 A1 | 1/2005 | Hoffman |
| 2005/0134768 A1 | 6/2005 | Sugiura et al. |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Covan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0148616 A1 | 6/2009 | Itami et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2011/0148826 A1 | 6/2011 | Koyama et al. |
| 2011/0148846 A1 | 6/2011 | Arasawa et al. |
| 2011/0157216 A1 | 6/2011 | Yamazaki et al. |
| 2011/0157253 A1 | 6/2011 | Yamazaki et al. |
| 2011/0157254 A1 | 6/2011 | Yamazaki et al. |
| 2011/0175833 A1 | 7/2011 | Kurokawa et al. |
| 2011/0194059 A1 | 8/2011 | Yamazaki |
| 2011/0216023 A1 | 9/2011 | Kurokawa et al. |
| 2011/0285945 A1 | 11/2011 | Aihara et al. |

FOREIGN PATENT DOCUMENTS

| | | |
|---|---|---|
| JP | 57-132190 A | 8/1982 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 06-175126 A | 6/1994 |
| JP | 08-264794 A | 10/1996 |
| JP | 11-505377 A | 5/1999 |
| JP | 2000-044236 A | 2/2000 |
| JP | 2000-150900 A | 5/2000 |
| JP | 2000-193964 A | 7/2000 |
| JP | 2002-076356 A | 3/2002 |
| JP | 2002-221716 A | 8/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| KR | 2002-0062799 A | 7/2002 |
| TW | 548689 B | 8/2003 |
| WO | 2004/114391 A1 | 12/2004 |

OTHER PUBLICATIONS

Asakuma, N. et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

(56) References Cited

OTHER PUBLICATIONS

Coates. D et al., "Optical Studies of the Amorphous Liquid-Cholesteric Liquid Crystal Transition: The Blue Phase," Physics Letters, Sep. 10, 1973, vol. 45A, No. 2, pp. 115-116.

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced At Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In-Ga-Zn-O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In-Ga-Zn-Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In-Ga-Zn-Oxide TFT," AM-FPD '09 Digest of Technical Papers, Jul. 1, 2009, pp. 41-44.

Hayashi, R et al., "42.1: Invited Paper: Improved Amorphous In-Ga-Zn-O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTs) for AMLCDs," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda., T et al.. "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancles in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium-Gallium-Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MOO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N. et al., "Spinel,YBFE2O4, and YB2FE3O7 Types of Structures for Compounds in the IN2O3 and SC2O3-A2O3-BO Systems [A; FE, GA, or AL; B: MG, MN, FE, NI, CU,or ZN] at Temperatures Over 1000°C," Journal of Solid State Chemistry, 1985, vol. 60, pp. 382-384.

Kimizuka, N. et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3-ZnGa2O4-ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium-Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6TH International Display Workshops, Dec. 3, 2008, pp. 581-584.

Nakamura, "Synthesis of Homologius Compound with New Long-Period Structure," NIRIM Newsletter, Mar. 1995, vol. 150, pp. 1-4 with English translation.

Nakamura, M et al., "The phase relations in the In2O3-Ga2ZnO4-ZnO system at 1350°C," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

(56) References Cited

OTHER PUBLICATIONS

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 in. QVGA AMOLED Display Using In-Ga-Zn-Oxide TFTs With a Novel Passivation Layer," SID Digest '09 : SID International Symposium Digest of Technical Papers, May 31, 2009, pp. 284-287.

Ohara, H et al., "Amorphous In-Ga-Zn-Oxide TFTs with Suppressed Variation for 4.0 inch QVGA AMOLED Display," AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m<4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In-Ga-Zn-Oxide TFT," SID Digest '09 : SID International Symposium Digest of Technical Papers, May 31, 2009, pp. 184-187.

Osada, T et al., "Development of Driver-Integrated Panel Using Amorphous In-Ga-Zn-Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium-Gallium-Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium-Gallium-Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-in. AMOLED Display With Driver Circuit Using Amorphous In-Ga-Zn-Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3-In2O3-ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Uneo, K et al., "Field-Effect Transistor on SrTiO3 with Sputtered Al2O3 Gate Insulator," Appl. Phys. Lett. (Applied Physics Letters), Sep. 1, 2003, vol. 89, No. 9. pp. 1755-1757.

Van De Walle, C, "Hydrogen as a Cause of Doping in Zinc Oxide," Phys. Rev. Lett. (Physical Review Letters), Jul. 31, 2002, vol. 85, No. 5, pp. 1012-1015.

Invitation to Pay Additional Fees, PCT Application No. PCT/JP2011/061119, dated Jun. 7, 2011, 6 pages.

* cited by examiner

FIG. 12A1 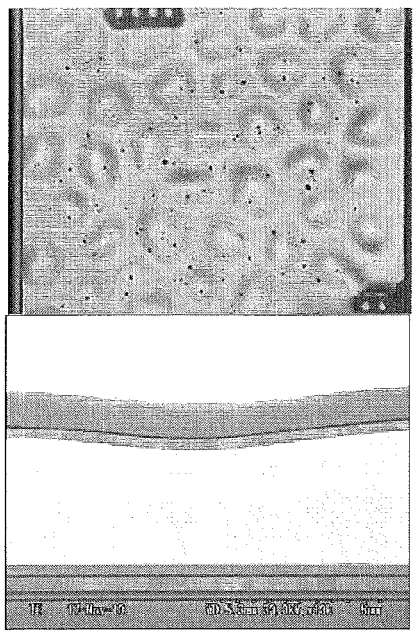
FIG. 12B1 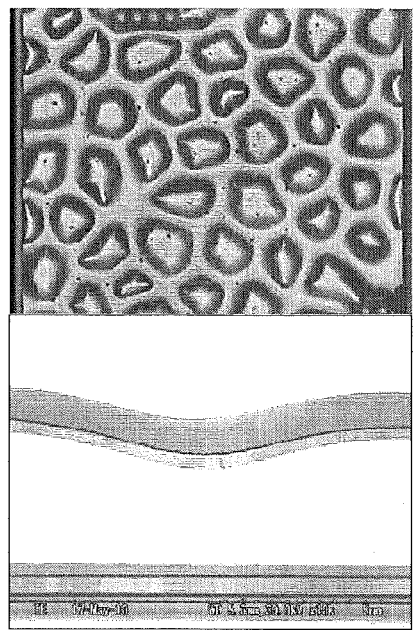
FIG. 12A2
FIG. 12C1 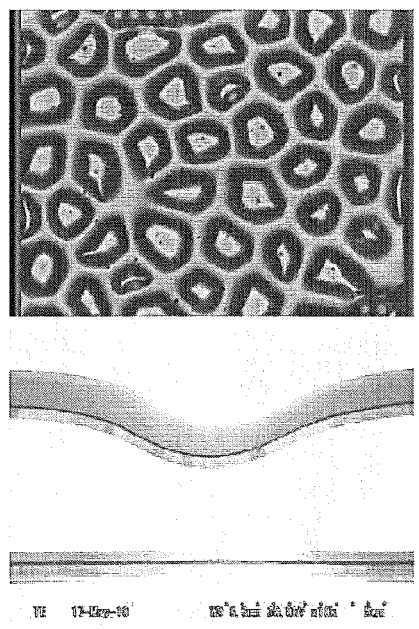
FIG. 12B2
FIG. 12D1 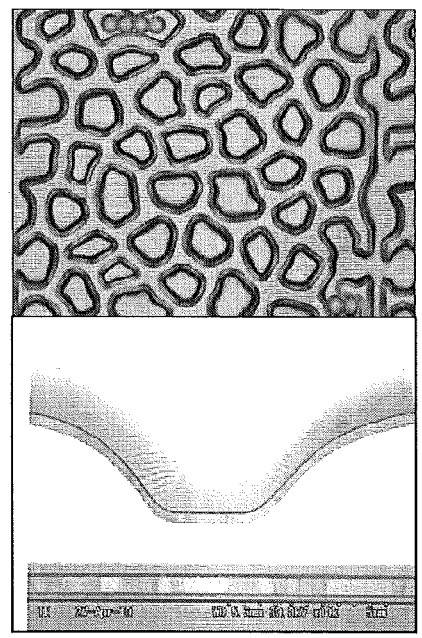
FIG. 12C2
FIG. 12D2

FIG. 15A1
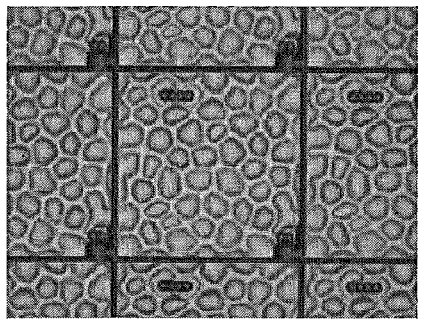
FIG. 15A2
FIG. 15B1
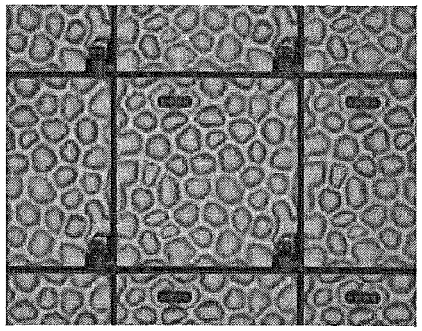
FIG. 15B2
FIG. 15C1
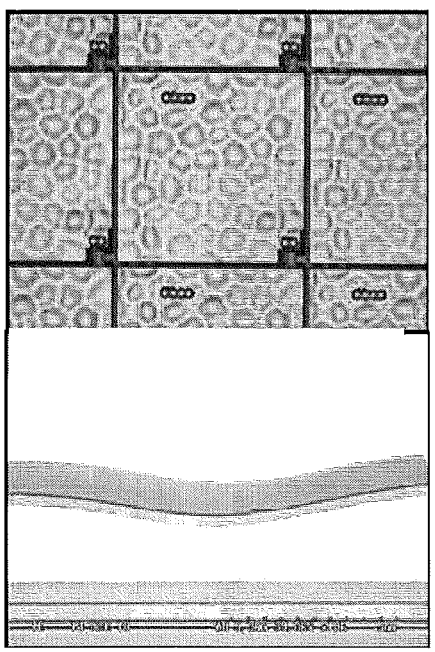
FIG. 15C2
FIG. 15D1
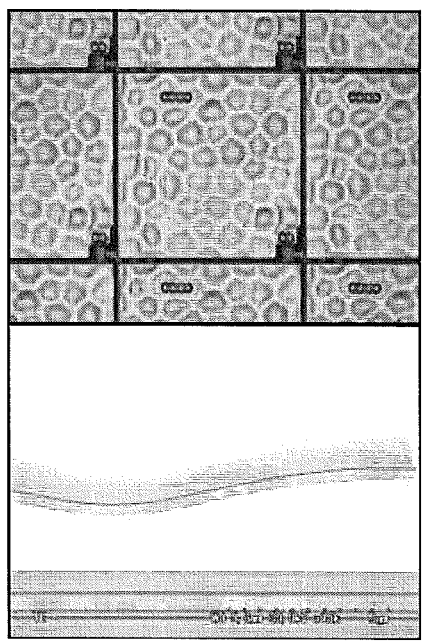
FIG. 15D2

LIQUID CRYSTAL DISPLAY DEVICE

TECHNICAL FIELD

The present invention relates to a liquid crystal display device which performs display by reflecting incident external light.

BACKGROUND ART

Liquid crystal display devices having liquid crystal elements are often used in display devices which are reduced in thickness and weight (so-called flat panel displays). Among liquid crystal display devices, reflective liquid crystal display devices which perform display by reflecting incident external light do not need light sources such as backlights and are thus easily reduced in thickness and weight, so that power consumption can be reduced.

However, reflective liquid crystal display devices which utilize natural light as light sources have a problem in that the amount of emitted light of the display devices does not reach half the amount of the natural light because optical members such as polarizing plates absorb the natural light.

In view of the problem, a reflective liquid crystal display device has been disclosed in which a display electrode reflecting light has a depression and a projection so as to increase the intensity of the reflected light (for example, see Patent Document 1).

REFERENCE

Patent Document

[Patent Document 1] Japanese Published Patent Application No. S57-132190

DISCLOSURE OF INVENTION

One object is to improve reflection efficiency of reflected light and to efficiently perform white display in a liquid crystal display device which performs display by reflecting incident external light.

One object is to provide a liquid crystal display device with higher visibility and higher image quality.

One embodiment of the disclosed invention is a liquid crystal display device including the following components: a liquid crystal layer between a first substrate and a second substrate; a reflective electrode layer between the first substrate and the liquid crystal layer; a light-transmitting electrode layer between the second substrate and the liquid crystal layer; and a polarizing plate on a side of the second substrate that is opposite to the liquid crystal layer side. The reflective electrode layer has a surface having a depression and a projection. A peak wavelength range in which transmittance of the light-transmitting electrode layer is increased is included in a wavelength range in which transmittance in a visible light range of the polarizing plate is decreased.

In the above structure, the average value of an inclination angle of the depression and the projection may be greater than or equal to 8° and less than or equal to 22°. Further, the average value of a gap of the depression and the projection may be greater than 10 μm and less than 30 μm. In one pixel, the depressions and the projections may be arranged in such a manner that 60% or more of the gaps of the depressions and the projections are greater than 10 μm and less than 30 μm. The reflective electrode layer may be a pixel electrode, and the depressions and the projections may be arranged symmetrically with respect to the center point of a planar shape of the pixel electrode and with respect to a straight line running through the center of the pixel electrode. An intensity ratio between light emitted through the polarizing plate in part of the wavelength range in which the transmittance in the visible light range of the polarizing plate is decreased and light emitted through the polarizing plate in part of a peak wavelength range in which the transmittance in the visible light range of the polarizing plate is increased may be greater than or equal to 0.8 and less than or equal to 1.2.

Note that the ordinal numbers such as "first" and "second" in this specification are used for convenience and do not denote the order of steps or the stacking order of layers. In addition, the ordinal numbers in this specification do not denote particular names which specify the present invention.

White display is performed utilizing reflected light which is efficiently scattered with the use of a pixel electrode layer whose surface has a depression and a projection, whereby reflection efficiency of the reflected light can be improved and white display can be efficiently performed.

A liquid crystal display device with higher visibility and higher image quality can be provided.

BRIEF DESCRIPTION OF DRAWINGS

In the accompanying drawings:

FIGS. 12A1, 12A2, 12B1, 12B2, 12C1, 12C2, 12D1, and 12D2 are plan optical micrographs and cross-sectional STEM images of pixel electrode layers in Example 1;

FIGS. 15A1, 15A2, 15B1, 15B2, 15C1, 15C2, 15D1, and 15D2 are plan optical micrographs and cross-sectional STEM images of pixel electrode layers in Example 3;

BEST MODE FOR CARRYING OUT THE INVENTION

Figure 1A:
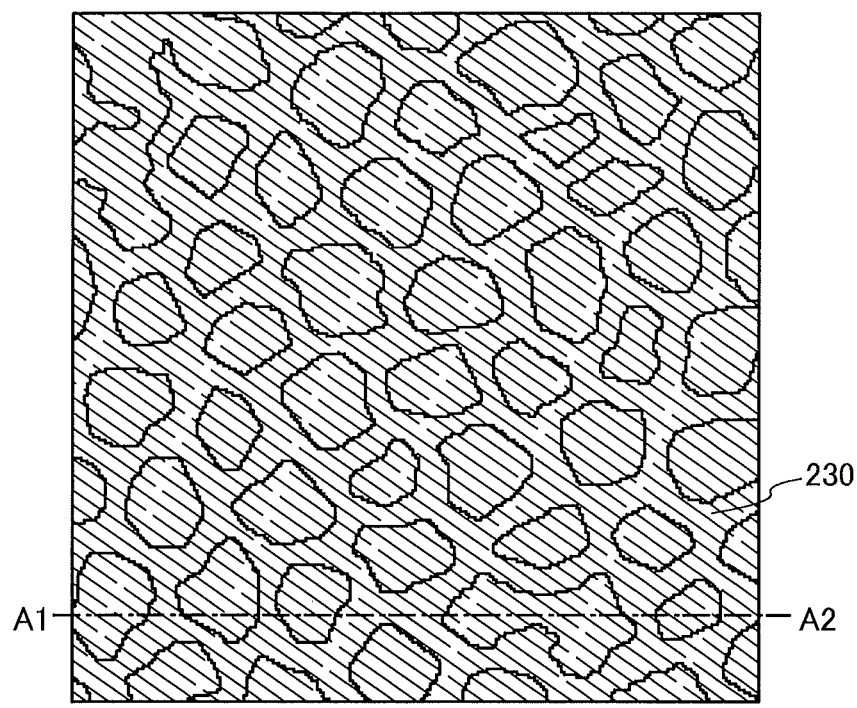
FIGS. 1A and 1B are diagrams illustrating one aspect of a liquid crystal display device.

Embodiments and examples will be described in detail with reference to the accompanying drawings. Note that the present invention is not limited to the description below, and it is easily understood by those skilled in the art that a variety of changes and modifications can be made without departing from the spirit and scope of the present invention. Therefore, the present invention should not be construed as being limited to the description of embodiments and examples below. Note that in the structures of the present invention described below, the same portions or portions having similar functions are denoted by the same reference numerals in different drawings, and description of such portions is not repeated.

Embodiment 1

Figure 1B:
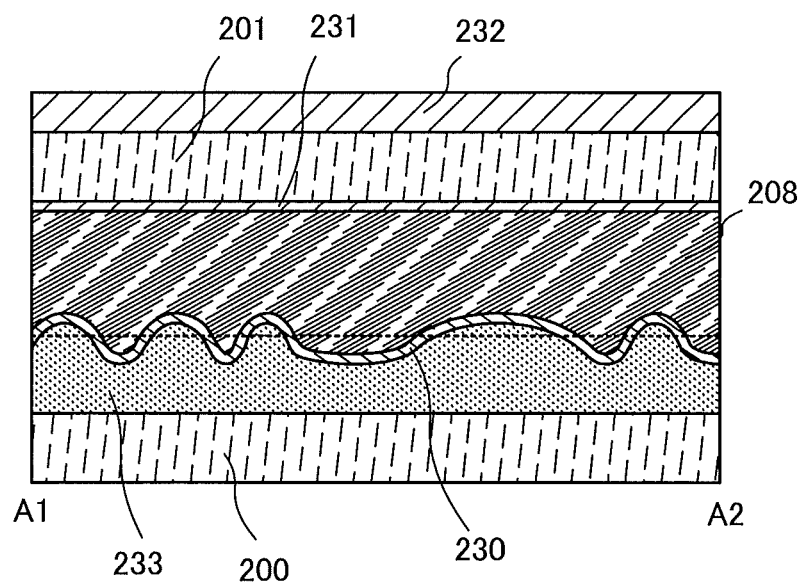

A liquid crystal display device which is one embodiment of a configuration of the invention disclosed in this specification will be described with reference to FIGS. 1A and 1B. FIG. 1A is a plan view of the liquid crystal display device. FIG. 1B is a cross-sectional view taken along a line A1-A2 in FIG. 1A. Note that the plan view in FIG. 1A illustrates a first substrate 200 side and does not illustrate components other than a pixel electrode layer 230. Solid lines in FIG. 1A corresponds to a dashed line in FIG. 1B and indicate the height of a depression and a projection of the pixel electrode layer 230.

In the liquid crystal display device illustrated in FIGS. 1A and 1B, the first substrate 200 and a second substrate 201 are disposed so as to face each other with a liquid crystal layer 208 interposed therebetween; the first substrate 200 is provided with the pixel electrode layer 230 and a structural body 233 and the second substrate 201 is provided with a common electrode layer 231; and over the second substrate 201, a polarizing plate 232 is provided. The pixel electrode layer 230 has reflectivity so as to reflect visible light. On the other hand, the common electrode layer 231 has light-transmitting properties so as to transmit the light.

The pixel electrode layer 230 is formed so as to cover the structural body 233 provided over the first substrate 200 and having a depression and a projection, thereby having a slightly undulating surface having a depression and a projection. The pixel electrode layer 230 has such a surface having a depression and a projection, whereby reflected light can be scattered by the depression and the projection. Thus, excellent white display can be performed.

In this embodiment, a reflective conductive material is used as the pixel electrode layer 230. For example, the pixel electrode layer 230 can be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy of these metals; and a nitride of these metals.

Figure 2:
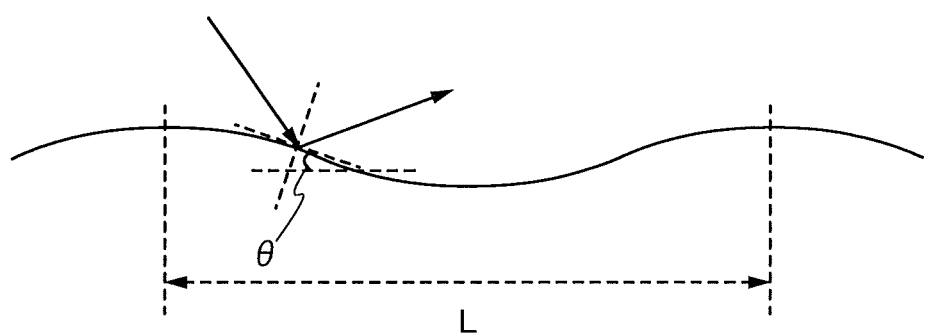
FIG. 2 is a schematic diagram illustrating reflection of light on a depression and a projection of a pixel electrode layer.

Here, an inclination angle and a gap of the depression and the projection of the pixel electrode layer 230 are described with reference to FIG. 2. FIG. 2 is a schematic diagram illustrating reflection of incident light on the depression and the projection of the pixel electrode layer 230. An inclination angle $\theta$ of the depression and the projection in FIG. 2 indicates an angle formed by a light reflection surface of the depression of the projection of the pixel electrode layer 230 and a horizontal surface on which the pixel electrode layer 230 is formed. The maximum angle $\theta$ which is formed by a projection and a depression adjacent to the projection among the inclination angles $\theta$ is called $\theta_M$. A gap L of the depression and the projection in FIG. 2 is a distance between the vertex of the projection and the vertex of a projection adjacent to the projection in the pixel electrode layer 230.

Here, when the angle $\theta_M$ is too small, the scattering effect of reflected light which is brought about by the depression and the projection of the pixel electrode layer 230 is reduced; therefore, it is difficult to perform white display. When the angle $\theta_M$ is too large, an angle which is formed by light reflected on the depression and the projection of the pixel electrode layer 230 and a plane of the second substrate is small; therefore, efficiency of extraction of the reflected light is reduced and brightness of emitted light is insufficient. Thus, in one pixel, the average value of the inclination angle $\theta_M$ of the depression and the projection of the pixel electrode layer 230 is greater than or equal to 5° and less than or equal to 25°, preferably greater than or equal to 8° and less than or equal to 22°, further preferably greater than 10° and less than or equal to 18°.

In addition, when the gap L of the depression and the projection is too large, the scattering effect of the reflected light which is brought about by the depression and the projection of the pixel electrode layer 230 is reduced; therefore, it is difficult to perform white display. When the gap L of the depression and the projection is too small, light is so finely scattered that more components go out of the field of vision of a user of the liquid crystal display device and brightness of emitted light is insufficient. Thus, the average value of the gap L of the depression and the projection of the pixel electrode layer 230 is preferably greater than 10 μm and less than 30 μm, further preferably greater than 15 μm and less than 25 μm.

Further, it is preferable that the shape and arrangement of the depressions and the projections of the pixel electrode layer 230 be irregular as illustrated in FIG. 1A. When the shape and arrangement of the depressions and the projections of the pixel electrode layer 230 are irregular, moire fringes due to interference of emitted light can be prevented from being formed in a display portion. Here, it is preferable that the depressions and the projections be provided in such a manner that in one pixel, 60% or more of the gaps L of the depressions and the projections of the pixel electrode layer 230 are greater than 10 μm and less than 30 μm.

Figure 3A:
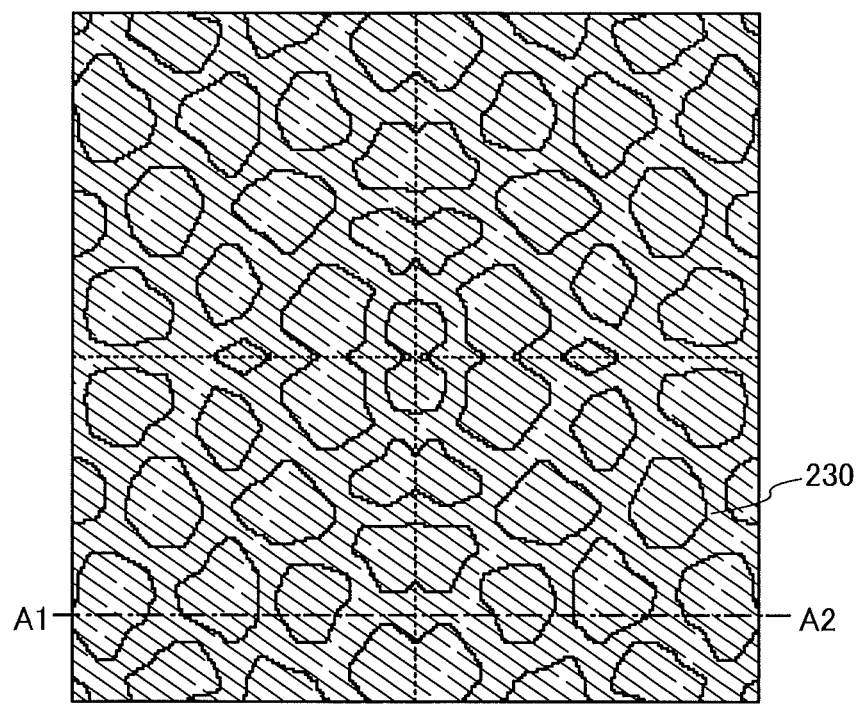
FIGS. 3A and 3B are diagrams illustrating one aspect of a liquid crystal display device.
Figure 3B:
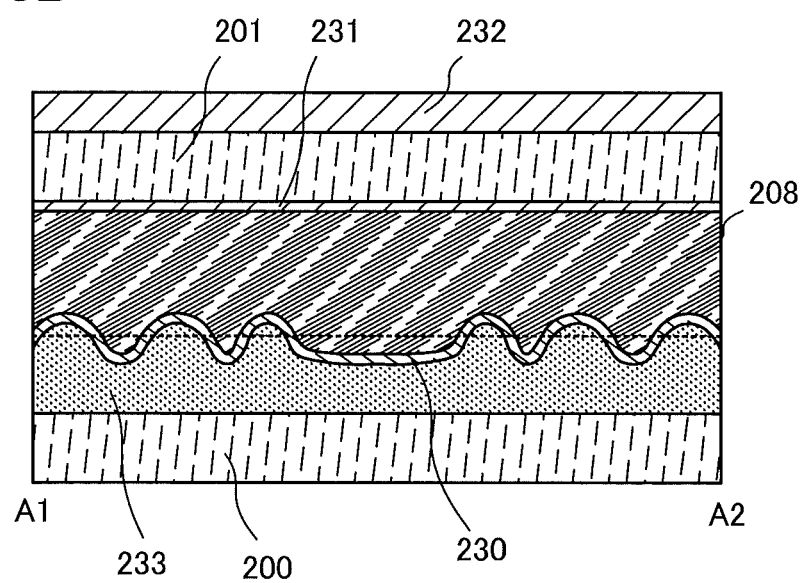

The depressions and the projections of the pixel electrode layer 230 may be provided symmetrically with respect to the center point of a planar shape of one pixel and with respect to a straight line running through the center of the one pixel. For example, as illustrated in FIGS. 3A and 3B, the depressions and the projections may be provided in such a manner that the depressions and the projections in one quarter region of the pixel electrode layer 230 are symmetrical to those in another quarter region with respect to the center straight line and the center point, where the quarter regions are formed by division of the pixel electrode layer 230 into four equal regions (upper, lower, left, and right regions) in the planar shape thereof. Note that FIGS. 3A and 3B correspond to FIGS. 1A and 1B, respectively, except for the arrangement of the depressions and the projections of the pixel electrode layer 230. By forming the depressions and the projections of the pixel electrode layer 230 in this manner, in a vertical and horizontal directions in the planar shape of the display portion, display can be uniformly performed regardless of the viewing direction.

White display is performed utilizing reflected light which is efficiently scattered with the use of the pixel electrode layer 230 whose surface has the depressions and the projections, whereby reflection efficiency of the reflected light can be improved and white display can be efficiently performed.

Thus, a liquid crystal display device with higher visibility and higher image quality can be provided.

Organic materials and inorganic materials can be used for formation of the structural body 233. Typically, a visible light curable resin, an ultraviolet curable resin, or a thermosetting resin is preferably used. For example, an acrylic resin, an epoxy resin, an amine resin, or the like can be used. Note that the structural body may have a stacked-layer structure of plural thin films.

There is no particular limitation on the method for forming the structural body 233, and a dry method such as an evaporation method, a sputtering method, or a CVD method or a wet method such as spin coating, dip coating, spray coating, a droplet discharging method (ink jetting), nanoimprinting, or various printing methods (screen printing or offset printing) may be used depending on the material. As needed, an etching method (dry etching or wet etching) may be employed to form a desired pattern. For example, the structural body 233 can be formed by performing a photolithography process on a photosensitive organic resin.

The shape of the structural body may be appropriately selected so that the surface of the pixel electrode layer 230 which has the depression and the projection is formed.

Note that although the surface of the pixel electrode layer 230 which has the depression and the projection is formed using the structural body 233 having the depression and the projection in the liquid crystal display device illustrated in FIGS. 1A and 1B and FIGS. 3A and 3B, the invention according to this embodiment is not limited thereto. For example, the surface of the pixel electrode layer 230 which has the depression and the projection may be formed by direct processing of the pixel electrode layer 230 by etching or the like.

The common electrode layer 231 is formed using a conductive material that transmits visible light. For example, the common electrode layer 231 can be formed using indium tin oxide (ITO), indium zinc oxide (IZO) in which zinc oxide (ZnO) is mixed in indium oxide, indium tin oxide containing silicon oxide (ITSO), a conductive material in which silicon oxide ($SiO_2$) is mixed in indium oxide, organoindium, organotin, indium oxide containing tungsten oxide, indium zinc oxide containing tungsten oxide, indium oxide containing titanium oxide, or indium tin oxide containing titanium oxide.

There is no particular limitation on the polarizing plate 232 as long as it can produce linearly polarized light from natural light or circularly polarized light. For example, a polarizing plate which has optical anisotropy by disposing dichroic substances in one direction can be used. Such a polarizing plate can be formed in such a manner that an iodine-based compound or the like is adsorbed to a film or the like such as a polyvinyl alcohol film and the film or the like is stretched in one direction. Note that as the dichroic substance, a dye-based compound or the like as well as an iodine-based compound can be used.

Here, since the display characteristics of a liquid crystal display device are greatly influenced by the transmittance of the polarizing plate 232, it is preferable that the polarizing plate 232 have a broad transmission spectrum in a visible light range (e.g., a wavelength range of 400 nm to 800 nm). However, a material which can be used as the polarizing plate 232 is limited, and practically, it is difficult to form the polarizing plate 232 which has an ideal transmission spectrum.

For example, in a general polarizing plate which is used in a liquid crystal display device, light absorption is observed in a short wavelength range of less than or equal to 500 nm. When such a polarizing plate is used, light emitted through the polarizing plate is short of blue components, which makes an image displayed by the liquid crystal display device brownish.

Thus, in one embodiment of the present invention, in order that light absorption by the polarizing plate 232 in a visible light range be compensated, optical characteristics of other components are adjusted. For example, by adjusting the thickness of the common electrode layer 231, the common electrode layer 231 is formed so as to have the maximum transmittance (the maximum transmittance in the visible light range) near the absorption band of the polarizing plate. That is, the components are combined in such a manner that a peak wavelength range in which transmittance of the common electrode layer 231 is increased is included in a wavelength range in which transmittance in a visible light range of the polarizing plate 232 is decreased. In other words, the transmittance in the visible light range of the common electrode layer 231 (a light-transmitting electrode layer) is higher than average in part (e.g., 450 nm) of a wavelength range (e.g., 400 nm to 500 nm) in which the transmittance in the visible light range (e.g., 400 nm to 800 nm) of the polarizing plate is lower than average. At this time, it is preferable that an intensity ratio between light emitted through the polarizing plate 232 in part of the wavelength range in which the transmittance in the visible light range of the polarizing plate 232 is decreased and light emitted through the polarizing plate 232 in part of a peak wavelength range in which the transmittance in the visible light range of the polarizing plate 232 is increased be greater than or equal to 0.8 and less than or equal to 1.2.

By employing such a structure, visible light components which are insufficient due to the polarizing plate 232 can be supplemented. Therefore, a liquid crystal display device whose optical characteristics are favorable in the visible light range can be provided. Specifically, a reflective liquid crystal display device which can perform excellent white display can be provided. Note that this effect is more distinctive when the above structure is combined with the pixel electrode layer 230 (the reflective electrode layer) which can scatter light more efficiently with the predetermined depression and projection. That is because background reflection is prevented and the intensity of the scattered light is increased, so that excellent white display is performed and generation of a color tone due to the polarizing plate can be suppressed.

Note that a component whose optical characteristics are adjusted is not necessarily the common electrode layer 231. When the thickness and material of a component are easily changed, the optical characteristics of the component can also be easily adjusted. Thus, the optical characteristics of such a component can be adjusted. Specifically, for example, the pixel electrode layer 230 (the reflective electrode layer) and the liquid crystal layer can be the component whose optical characteristics are adjusted.

As the liquid crystal layer 208, nematic liquid crystal, cholesteric liquid crystal, smectic liquid crystal, discotic liquid crystal, thermotropic liquid crystal, lyotropic liquid crystal, low-molecular liquid crystal, polymer dispersed liquid crystal (PDLC), ferroelectric liquid crystal, anti-ferroelectric liquid crystal, main-chain liquid crystal, side-chain high-molecular liquid crystal, banana-shaped liquid crystal, or the like can be used.

The liquid crystal layer 208 is formed using liquid crystal including an ultraviolet curable resin and the liquid crystal layer 208 may be applied to a liquid crystal display device having a display mode typified by a polymer dispersed liquid crystal (PDLC) mode, a polymer network liquid crystal (PNLC) mode, or a blue phase mode.

A cell gap that is the thickness of the liquid crystal layer 208 may be greater than or equal to 5 μm and less than or equal to 30 μm (preferably greater than or equal to 10 μm and less than or equal to 20 μm). In this specification, the thickness of a cell gap refers to the length (film thickness) of a thickest part of a liquid crystal layer.

Alignment films are preferably provided between the pixel electrode layer 230 and the liquid crystal layer 208 and between the liquid crystal layer 208 and the common electrode layer 231. The alignment film can be formed using an organic resin such as polyimide or polyvinyl alcohol or an inorganic material such as silicon oxide.

As the first substrate 200 and the second substrate 201, a glass substrate of barium borosilicate glass, aluminoborosilicate glass, or the like, a quartz substrate, a plastic substrate, or the like can be used. Note that the first substrate 200 and the second substrate 201 are fixed to each other with the use of a sealant with the liquid crystal layer 208 interposed therebetween. As the sealant, it is preferable to use a visible light curable resin, an ultraviolet curable resin, or a thermosetting resin representatively. Typically, an acrylic resin, an epoxy resin, an amine resin, or the like can be used. Further, a photopolymerization initiator (typically, an ultraviolet light polymerization initiator), a thermosetting agent, a filler, or a coupling agent may be included in the sealant.

The liquid crystal display device here is a reflective liquid crystal display device which performs display by reflecting external light. Therefore, at least in a pixel region, a substrate, an electrode layer, and an insulating layer which are provided on the viewer side need to transmit light. Accordingly, the substrate and thin films such as an insulating layer and an electrode layer existing in the pixel region through which light is transmitted transmit light in a visible wavelength range. On the other hand, a reflective electrode layer, a reflective film, and a coloring layer used for performing display are provided on a light reflection side which is opposite to the viewer side.

Figure 4A:
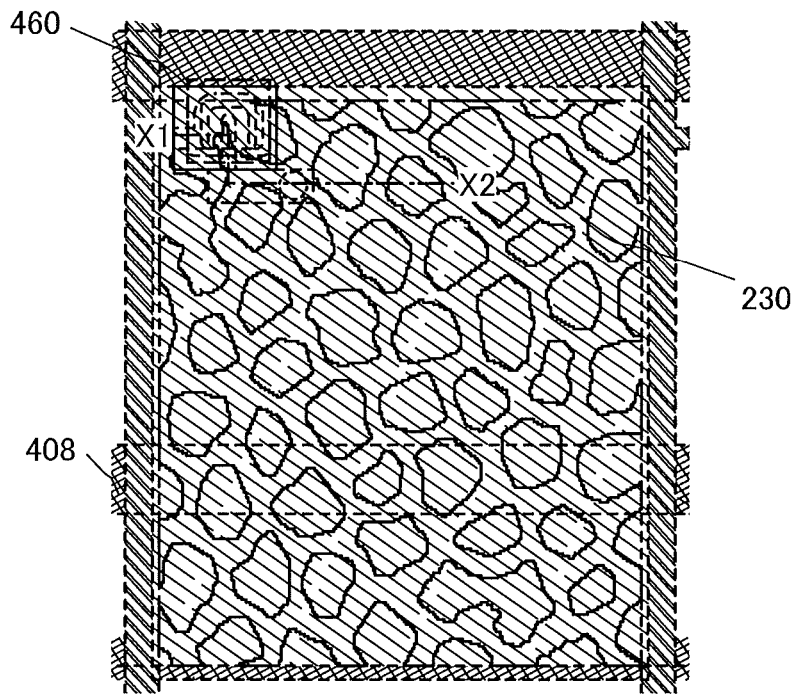
FIGS. 4A and 4B are diagrams illustrating one aspect of a liquid crystal display device.
Figure 4B:
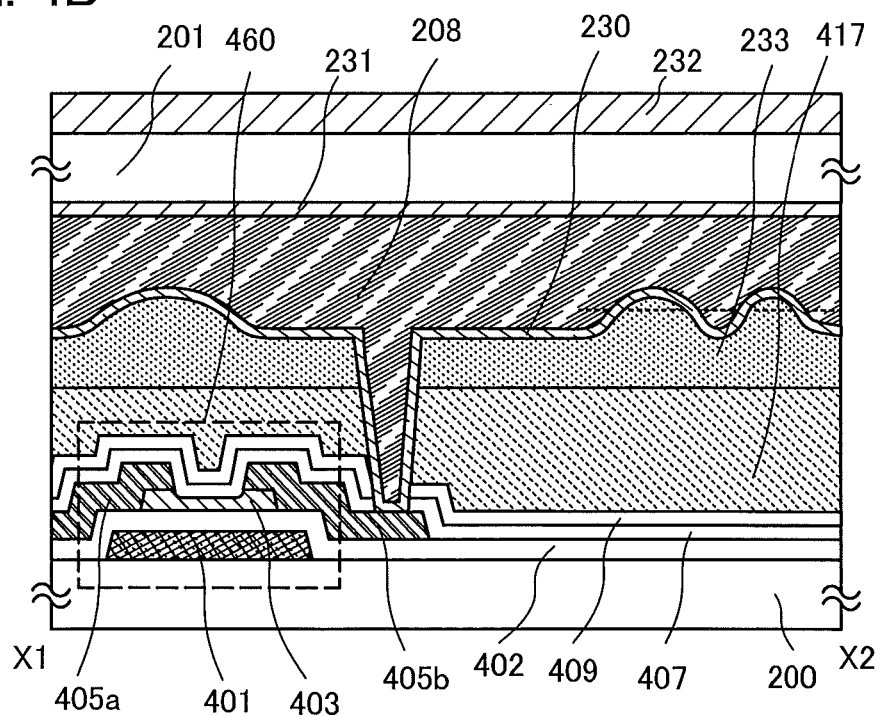

Further, by using an active matrix substrate on which a transistor is formed as illustrated in FIGS. 4A and 4B, an active matrix liquid crystal display device can be manufactured.

FIG. 4A is a plan view of a liquid crystal display device and a region for one pixel is illustrated. FIG. 4B is a cross-sectional view taken along a line X1-X2 of FIG. 4A.

FIGS. 4A and 4B illustrate a liquid crystal display device in which the first substrate 200 provided with the pixel electrode layer 230, the structural body 233 over a transistor 460 with an interlayer film 417 provided therebetween and the second substrate 201 provided with the common electrode layer 231 and the polarizing plate 232 are disposed so as to face each other with the liquid crystal layer 208 interposed therebetween. Note that the first substrate 200, the structural body 233, the pixel electrode layer 230, the liquid crystal layer 208, the common electrode layer 231, the second substrate 201, and the polarizing plate 232 are similar to those illustrated in FIGS. 1A and 1B or FIGS. 3A and 3B.

In FIG. 4A, a plurality of source wiring layers (including a source electrode layer 405a) is provided in parallel to each other (extends in the vertical direction in the drawing) and apart from each other. A plurality of gate wiring layers (including a gate electrode layer 401) extends in a direction substantially perpendicular to the source wiring layers (the horizontal direction in the drawing) and is provided apart from each other. Capacitor wiring layers 408 are adjacent to the plurality of gate wiring layers and extend in a direction substantially parallel to the gate wiring layers, namely, a direction substantially perpendicular to the source wiring layers (the horizontal direction in the drawing). A substantially rectangular space is surrounded by the source wiring layers and the gate wiring layers. In this space, the pixel electrode layer 230 of the liquid crystal display device is provided and the common electrode layer 231 is provided over the pixel electrode layer 230 with the liquid crystal layer 208 provided therebetween. The transistor 460 for driving the pixel electrode layer is provided at an upper left corner of the drawing. A plurality of pixel electrode layers and a plurality of transistors are arranged in matrix. Note that capacitance is formed by the pixel electrode layer 230 and the capacitor wiring layer 408.

Note that in the plan view of FIG. 4A, the first substrate 200 side (i.e., an element substrate side) is illustrated and the liquid crystal layer 208, the common electrode layer 231, and the second substrate 201 are not illustrated.

The pixel electrode layer 230 is supplied with a potential of an image signal through a source electrode layer or a drain electrode layer electrically connected to a semiconductor layer of the transistor. On the other hand, the common electrode layer 231 of the liquid crystal element is supplied with a fixed potential (e.g., a ground potential) serving as a reference with respect to the potential of the image signal supplied to the pixel electrode layer. The common potential is preferably set to a potential around an intermediate potential of an image signal which is transmitted as data in such a level as not to generate flickers. The common electrode layer can operate in a floating state (an electrically isolated state).

As illustrated in FIG. 4B, the transistor 460 is an inverted-staggered thin film transistor which includes, over the first substrate 200 having an insulating surface, the gate electrode layer 401, a gate insulating layer 402, a semiconductor layer 403, the source electrode layer 405a, and a drain electrode layer 405b. An insulating film 407 which covers the transistor 460 and is in contact with the semiconductor layer 403, and an insulating layer 409 that is a protective insulating layer are provided. The interlayer film 417 is stacked over the insulating layer 409. Further, the drain electrode layer 405b of the transistor 460 is electrically connected to the pixel electrode layer 230 through an opening formed in the insulating film 407, the insulating layer 409; and the interlayer film 417.

Note that this embodiment shows the example in which the pixel electrode layer 230 is in contact with the drain electrode layer 405b of the transistor 460 and continuously formed on the structural body 233; however, the pixel electrode layer 230 may be formed on an electrode layer which is formed in contact with the drain electrode layer 405b.

An insulating film serving as a base film may be provided between the first substrate 200 and the gate electrode layer 401. The base film has a function of preventing diffusion of an impurity element from the first substrate 200, and can be formed to have a single-layer structure or a stacked-layer structure using one or more films selected from a silicon nitride film, a silicon oxide film, a silicon nitride oxide film, and a silicon oxynitride film.

The gate electrode layer 401 can be formed to have a single-layer structure or a multi-layer structure using a metal material such as molybdenum, titanium, tantalum, tungsten, aluminum, copper, neodymium, or scandium, or an alloy material containing any of these as its main component.

The gate insulating layer 402 can be formed to have a single-layer structure or a stacked-layer structure using a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a gallium oxide layer, or a hafnium oxide layer by a plasma CVD method, a sputtering method, or the like.

As a conductive film used as the source electrode layer 405a and the drain electrode layer 405b, for example, a metal film containing an element selected from Al, Cr, Cu, Ta, Ti, Mo, and W and a metal nitride film containing any of the above elements as its component (a titanium nitride film, a molybdenum nitride film, and a tungsten nitride film) can be given. Alternatively, a conductive film may be used in which a high-melting-point metal film of Ti, Mo, W, or the like or a metal nitride film of any of these elements (a titanium nitride film, a molybdenum nitride film, or a tungsten nitride film) may be stacked on one of or both a bottom side and a top side of a metal film of Al, Cu, or the like.

Alternatively, the conductive film used as the source electrode layer 405a and the drain electrode layer 405b may be formed using conductive metal oxide. As conductive metal oxide, indium oxide ($In_2O_3$), tin oxide ($SnO_2$), zinc oxide (ZnO), indium oxide-tin oxide alloy ($In_2O_3$—$SnO_2$; abbreviated to ITO), indium oxide-zinc oxide alloy ($In_2O_3$—ZnO), or any of these metal oxide materials in which silicon oxide is contained can be used.

The semiconductor layer 403 can be formed using an oxide semiconductor film. As a material of the oxide semiconductor film, for example, an oxide semiconductor material containing indium or an oxide semiconductor material containing indium and gallium may be used.

As a material of the oxide semiconductor film, any of the following materials can be used: four-component metal oxide such as an In—Sn—Ga—Zn—O-based material; three-component metal oxide such as an In—Ga—Zn—O-based material, an In—Sn—Zn—O-based material, an In—Al—Zn—O-based material, a Sn—Ga—Zn—O-based material, an Al—Ga—Zn—O-based material, and a Sn—Al—Zn—O-based material; two-component metal oxide such as an In—Zn—O-based material, a Sn—Zn—O-based material, an Al—Zn—O-based material, a Zn—Mg—O-based material, a Sn—Mg—O-based material, an In—Mg—O-based material, and an In—Ga—O-based material; and single-component metal oxide such as an In—O-based material, a Sn—O-based material, and a Zn—O-based material. In addition, the above materials may contain $SiO_2$. Here, for example, an In—Ga—Zn—O-based material means an oxide film containing indium (In), gallium (Ga), and zinc (Zn), and there is no particular limitation on the composition ratio. Further, the In—Ga—Zn—O-based material may contain an element other than In, Ga, and Zn.

As the oxide semiconductor film, a thin film using a material represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

When an In—Ga—Zn—O-based material is used as the oxide semiconductor, for example, an oxide target having a composition ratio of $In_2O_3$:$Ga_2O_3$:ZnO=1:1:1 [molar ratio] can be used. Note that the material and composition ratio are not limited thereto; for example, an oxide target having a composition ratio of $In_2O_3$:$Ga_2O_3$:ZnO=1:1:2 [molar ratio] may be used.

In the case where an In—Zn—O-based material is used as the oxide semiconductor, the composition ratio of a target used is In:Zn=50:1 to 1:2 in an atomic ratio ($In_2O_3$:ZnO=25:1 to 1:4 in a molar ratio), preferably In:Zn=20:1 to 1:1 in an atomic ratio ($In_2O_3$:ZnO=10:1 to 1:2 in a molar ratio), more preferably In:Zn=15:1 to 1.5:1 in an atomic ratio ($In_2O_3$:ZnO=15:2 to 3:4 in a molar ratio). For example, in a target used for forming an In—Zn—O-based oxide semiconductor which has an atomic ratio of In:Zn:O=X:Y:Z, the relation of Z>1.5X+Y is satisfied.

It is preferable to form the oxide semiconductor film by a method by which hydrogen, water, or the like does not easily enter the oxide semiconductor film. For example, a sputtering method can be used. The preferred thickness of the oxide semiconductor film is greater than or equal to 3 nm and less than or equal to 30 nm. This is because the transistor might possibly be normally on when the oxide semiconductor film is too thick (e.g., the thickness is 50 nm or more).

The oxide semiconductor film may be formed in a rare gas (typically argon) atmosphere, an oxygen atmosphere, a mixed atmosphere containing a rare gas and oxygen, or the like. Moreover, it is preferable that an atmosphere using a high-purity gas in which impurities containing hydrogen atoms, such as hydrogen, water, a hydroxyl group, and hydride, are sufficiently removed be used because entry of hydrogen, water, a hydroxyl group, and hydride into the oxide semiconductor film can be prevented.

Further, heat treatment is preferably performed on the oxide semiconductor film after formation. By performing heat treatment, impurities such as water or hydrogen contained in the oxide semiconductor film can be removed; alternatively, oxygen can be supplied to the oxide semiconductor film.

By using such an oxide semiconductor film as the semiconductor layer 403, a current value in an off state (an off-state current value) can be small. Accordingly, an electrical signal such as an image signal can be held for a longer period, and a writing interval can be set longer in an on state. Since the frequency of refresh operation can be reduced accordingly, the power consumption can be further suppressed.

In the process of forming the semiconductor layer, the electrode layer, and the wiring layer, etching is performed in order to process a thin film into a desired shape. Dry etching or wet etching can be used for the etching step.

As an etching apparatus used for the dry etching, an etching apparatus using a reactive ion etching method (an RIE method), or a dry etching apparatus using a high-density plasma source such as ECR (electron cyclotron resonance) or ICP (inductively coupled plasma) can be used.

In order to etch the film into a desired shape, the etching condition (the amount of electric power applied to a coil-shaped electrode, the amount of electric power applied to an electrode on a substrate side, the temperature of the electrode on the substrate side, or the like) is adjusted as appropriate.

The etching conditions (such as an etchant, etching time, and temperature) are appropriately adjusted depending on the material so that the film can be etched into a desired shape.

Note that the semiconductor layer 403 of the transistor 460 is an example of a semiconductor layer which is partly etched so as to have a groove (a depression).

An inorganic insulating film or an organic insulating film formed by a dry method or a wet method can be used as the insulating film 407 and the insulating layer 409 which cover the transistor 460. For example, it is possible to use a single-layer structure or a stacked-layer structure of a silicon nitride film, a silicon oxide film, a silicon oxynitride film, an aluminum oxide film, a tantalum oxide film, or a gallium oxide film which is formed by a CVD method, a sputtering method, or the like.

The interlayer film 417 can be formed using an organic material such as polyimide, acrylic, benzocyclobutene, polyamide, or epoxy. Other than such organic materials, it is also possible to use a low-dielectric constant material (a low-k material), a siloxane-based resin, PSG (phosphosilicate glass), BPSG (borophosphosilicate glass), or the like.

Note that the siloxane-based resin corresponds to a resin including a Si—O—Si bond formed using a siloxane-based material as a starting material. The siloxane-based resin may include as a substituent an organic group (e.g., an alkyl group or an aryl group) or a fluoro group. In addition, the organic group may include a fluoro group. A siloxane-based resin is applied by a coating method and baked; thus, the insulating film 407 can be formed.

There is no particular limitation on the method for forming the interlayer film 417 and the interlayer film 417 can be formed, depending on the material, by a method such as spin coating, dipping, spray coating, droplet discharging (e.g., ink-jetting, screen printing, or offset printing), roll coating, curtain coating, or knife coating.

Instead of provision of the structural body 233 over the interlayer film 417, an upper part of the interlayer film 417 may be directly processed so as to have a depression and a projection.

As described above, white display is performed utilizing reflected light which is efficiently scattered with the use of the pixel electrode layer whose surface has depressions and projections, whereby reflection efficiency of the reflected light can be improved and white display can be efficiently performed. Thus, a liquid crystal display device with higher visibility and higher image quality can be provided.

In the liquid crystal display devices described with reference to FIGS. 1A and 1B, FIG. 2, FIGS. 3A and 3B, and FIGS. 4A and 4B, the pixel electrode layer 230 and the common electrode layer 231 are a reflective electrode which reflects visible light and a light-transmitting electrode which transmits visible light, respectively; however, the invention according to this embodiment is not limited thereto. For example, the pixel electrode layer may be a light-transmitting electrode which transmits visible light, and the common electrode layer may be a reflective electrode which reflects the light. In that case, the common electrode layer needs to have a surface provided with a depression and a projection which is similar to that of the pixel electrode layer 230.

Note that although the surface of the pixel electrode layer 230 which has the depression and the projection is formed using the structural body 233 having the depression and the projection in the liquid crystal display devices described with reference to FIGS. 1A and 1B, FIG. 2, FIGS. 3A and 3B, and FIGS. 4A and 4B, the invention according to this embodiment is not limited thereto. For example, the surface of the pixel electrode layer 230 which has the depression and the projection may be formed by direct processing of the pixel electrode layer 230 by etching or the like.

Figure 18A:
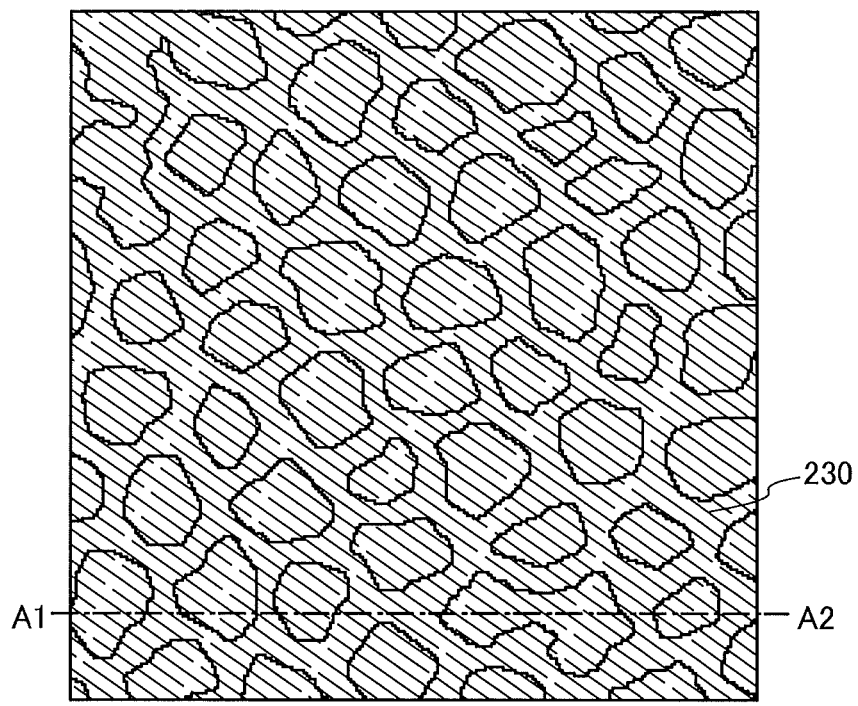
FIGS. 18A and 18B are diagrams illustrating one aspect of a liquid crystal display device.
Figure 18B:
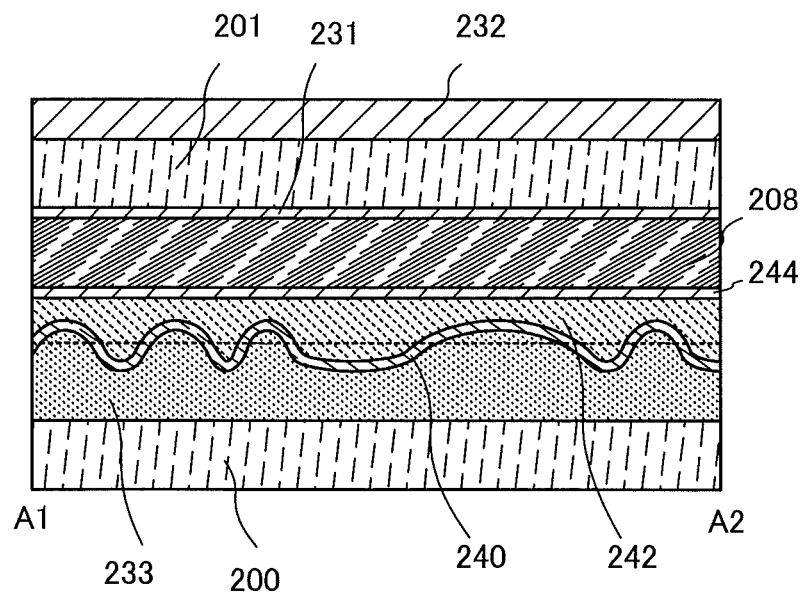

Although the pixel electrode layer 230 has the depression and the projection by being directly provided over the structural body 233 in the liquid crystal display devices described with reference to in FIGS. 1A and 1B, FIG. 2, FIGS. 3A and 3B, and FIGS. 4A and 4B, the invention according to this embodiment is not limited thereto. A structure illustrated in FIGS. 18A and 18B may be employed in which a reflective film 240 having a depression and a projection is provided over the structural body 233, a planarizing film 242 is provided over the reflective film 240, and a pixel electrode layer 244 having high flatness is provided over the planarizing film 242. By employing this structure, a lower part of the liquid crystal layer 208 can be flat, whereby an electric field between the common electrode layer 231 and the pixel electrode layer 244 can be prevented from being disturbed by the depression and the projection of the structural body 233. Here, the reflective film 240 can be formed using a material similar to the pixel electrode layer 230; the planarizing film 242 can be formed using a material similar to the structural body 233; and the pixel electrode layer 244 can be formed using a material similar to the common electrode layer 231. Note that the structure illustrated in FIGS. 18A and 18B is similar to that illustrated in FIGS. 1A and 1B except for the reflective film 240, the planarizing film 242, and the pixel electrode layer 244.

The structures, methods, and the like described in this embodiment can be combined as appropriate with any of the structures, methods, and the like described in the other embodiments.

Embodiment 2

In this embodiment, a driving method of a liquid crystal display device by which power consumption can be reduced by a combination with Embodiment 1 is described.

In a liquid crystal display device, display is performed on its screen by switching a plurality of different images, which is obtained by time division into a plurality of frame periods, at high speed. However, in some cases, display is performed in which image signals in successive frame periods (e.g., an n-th frame and an (n+1)-th frame) are not different (such display is also referred to as a still-image display mode), even though a plurality of images which is obtained by time-division into a plurality of frame periods is switched at high speed. In this specification, an image displayed in the still-image display mode is referred to as a still image.

A display mode employed in this embodiment is as follows: in the case of display (also referred to as a moving-image display mode) in which image signals in successive frames are different from each other, an image signal is written per frame; in the case of a still-image display mode in which image signals in successive frames are the same, a different image signal is not written, and a voltage applied to a liquid crystal element is held by putting a pixel electrode and a common electrode which apply the voltage to the liquid crystal element in a floating state, so that a still image is displayed without supply of a different voltage. Note that moving-image display in this specification is display in which image signals in successive frames are different from each other and different image data needs inputting. Rewriting of image data only in one frame is also referred to as moving image display.

The liquid crystal display device of this embodiment and switching of display modes of the liquid crystal display device will be described with reference to FIG. 5, FIG. 6, FIG. 7, FIGS. 8A and 8B, and FIG. 9.

Figure 5:
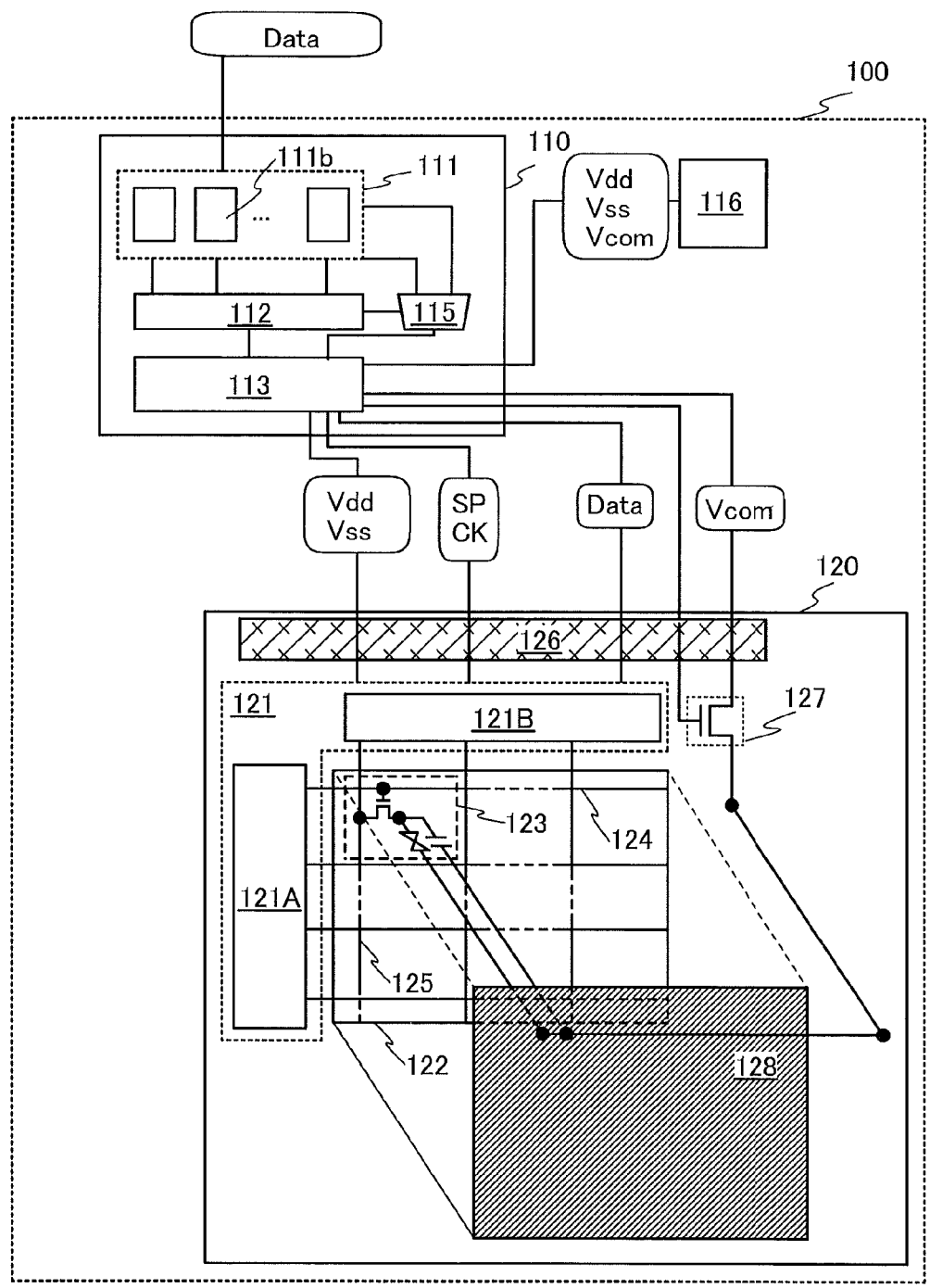
FIG. 5 is a diagram illustrating one aspect of a liquid crystal display device.

Each configuration of a liquid crystal display device 100 of this embodiment will be described with reference to a block diagram of FIG. 5. The liquid crystal display device 100 is a reflective liquid crystal display device which performs display by utilizing reflection of external light in a pixel and includes an image processing circuit 110, a power source 116, and a display panel 120.

To the liquid crystal display device 100, an image signal (an image signal Data) is supplied from an external device connected to the liquid crystal display device. Note that power supply potentials (a high power supply potential $V_{dd}$, a low power supply potential $V_{ss}$, and a common potential $V_{com}$) are supplied by turning on the power source 116 of the liquid crystal display device and starting supplying power, and a control signal (a start pulse SP and a clock signal CK) is supplied by a display control circuit 113. Further, when the supply of the power supply potentials (the high power supply potential $V_{dd}$, the low power supply potential $V_{ss}$, and the common potential $V_{com}$) is stopped, the power source 116 is turned off and the supply of the power supply potentials to the display panel is stopped.

In the case where the image signal is an analog signal, the image signal is preferably converted into a digital signal by an A/D converter or the like to be supplied to the image processing circuit 110 of the liquid crystal display device 100 because later detection of a difference of image signals can be performed easily.

A configuration of the image processing circuit 110 and a process in which the image processing circuit 110 processes a signal will be described.

The image processing circuit 110 includes a memory circuit 111, a comparator circuit 112, a display control circuit 113, and a selection circuit 115. The image processing circuit 110 generates a display panel image signal from the digital image signal Data that is input. The display panel image signal is an image signal which controls the display panel 120. The image processing circuit 110 outputs a signal that controls a common electrode 128 to a switching element 127.

The memory circuit 111 includes a plurality of frame memories for storing image signals in a plurality of frames. The number of frame memories included in the memory circuit 111 is not particularly limited as long as the image signals for a plurality of frames can be stored. The frame memory may be formed using a memory element such as dynamic random access memory (DRAM) or static random access memory (SRAM).

The number of frame memories is not particularly limited as long as an image signal can be stored for each frame period. Further, the image signals stored in the frame memories are selectively read out by the comparator circuit 112 and the display control circuit 113. Note that frame memories 111b in the drawing each schematically show a memory region for one frame.

The comparator circuit 112 is a circuit which selectively reads out image signals in successive frame periods stored in the memory circuit 111, compares the image signals in the series of frame periods in each pixel, and detects a difference thereof.

In this embodiment, depending on whether a difference of image signals between frames is detected or not, operation in the display control circuit 113 and the selection circuit 115 is determined. When a difference is detected between the frames in any of the pixels by the comparator circuit 112 (when there is a difference), the comparator circuit 112 determines that image signals are not for a still image and that successive frame periods between which the difference is detected are periods for displaying a moving image.

Note that when a difference between frames is detected only in some of the pixels, a configuration may be employed in which image data is written only in the pixels where the difference is detected. In that case, decoder circuits are used as a gate line driver circuit 121A and a source line driver circuit 121B of a driver circuit portion 121.

On the other hand, when a difference is not detected in all the pixels by comparing image signals in the comparator circuit 112 (when there is no difference), successive frame periods between which no difference is detected are determined as periods for displaying a still image. In other words, the comparator circuit 112 detects presence or absence of a difference between image signals in successive frame periods, thereby determining whether the image signals are for displaying a moving image or for displaying a still image.

The presence of the difference may be detected by the comparison when a difference exceeds a predetermined level. The comparator circuit 112 may be set so as to detect a difference in accordance with the absolute value of the difference.

In this embodiment, the configuration is described in which whether an image is a moving image, which needs input of image data, or a still image is determined by detection of the difference between the image signals in successive frame periods by the comparator circuit 112 provided inside the liquid crystal display device 100; however, the present invention is not limited to this configuration, and a configuration in which a signal indicating whether the image is a still image or a moving image is supplied from the outside may be employed.

The selection circuit 115 employs a configuration in which a plurality of switches formed using transistors is provided, for example. In the case where the comparator circuit 112 detects a difference in successive frame periods, that is, the image is a moving image, the selection circuit 115 selects an image signal of the moving image from the frame memories in the memory circuit 111 and outputs the image signal to the display control circuit 113.

Note that when the comparator circuit 112 does not detect a difference in the successive frame periods, that is, the image is a still image, the selection circuit 115 does not output the image signal to the display control circuit 113 from the frame memories in the memory circuit 111. With the configuration in which an image signal is not output to the display control circuit 113 from the frame memory, power consumption of the liquid crystal display device can be reduced.

Note that in the liquid crystal display device of this embodiment, a mode performed in such a way that the comparator circuit 112 determines an image as a still image is described as a still image display mode, and a mode performed in such a way that the comparator circuit 112 determines an image as a moving image is described as a moving image display mode.

The display control circuit 113 supplies an image signal which is selected by the selection circuit 115, a control signal (specifically, a signal for controlling supply or stop of the supply of the control signal such as the start pulse SP and the clock signal CK), and the power supply potentials (the high power supply potential $V_{dd}$, the low power supply potential $V_{ss}$, and the common potential $V_{com}$) to the display panel 120.

Note that the image processing circuit described in this embodiment as an example may have a display-mode switching function. The display-mode switching function is a function of switching between a moving-image display mode and a still-image display mode in such a manner that a user of the liquid crystal display device selects an operation mode of the liquid crystal display device by hand or using an external connection device.

The selection circuit 115 can output the image signal to the display control circuit 113 in accordance with a signal input from a display-mode switching circuit.

For example, in the case where a mode-switching signal is input to the selection circuit 115 from the display mode switching circuit while operation is performed in a still-image display mode, even when the comparator circuit 112 does not detect the difference of the image signals in successive frame periods, the selection circuit 115 can be operated in a mode in which image signals which are input are sequentially output to the display control circuit 113, that is, in a moving-image display mode. In the case where a mode-switching signal is input to the selection circuit 115 from the display-mode switching circuit while operation is performed in a moving-image display mode, even when the comparator circuit 112 detects the difference of the image signals in successive frame periods, the selection circuit 115 can be operated in a mode in which only an image signal in one selected frame is output, that is, in a still-image display mode. As a result, in the liquid crystal display device of this embodiment, one frame among moving images is displayed as a still image.

The structure described in Embodiment 1 can be employed in the display panel 120. In this embodiment, the display panel 120 includes the switching element 127 besides a pixel portion 122. In this embodiment, the display panel 120 includes the first substrate and the second substrate. The first substrate is provided with the driver circuit portion 121, the pixel portion 122, and the switching element 127.

Figure 6:
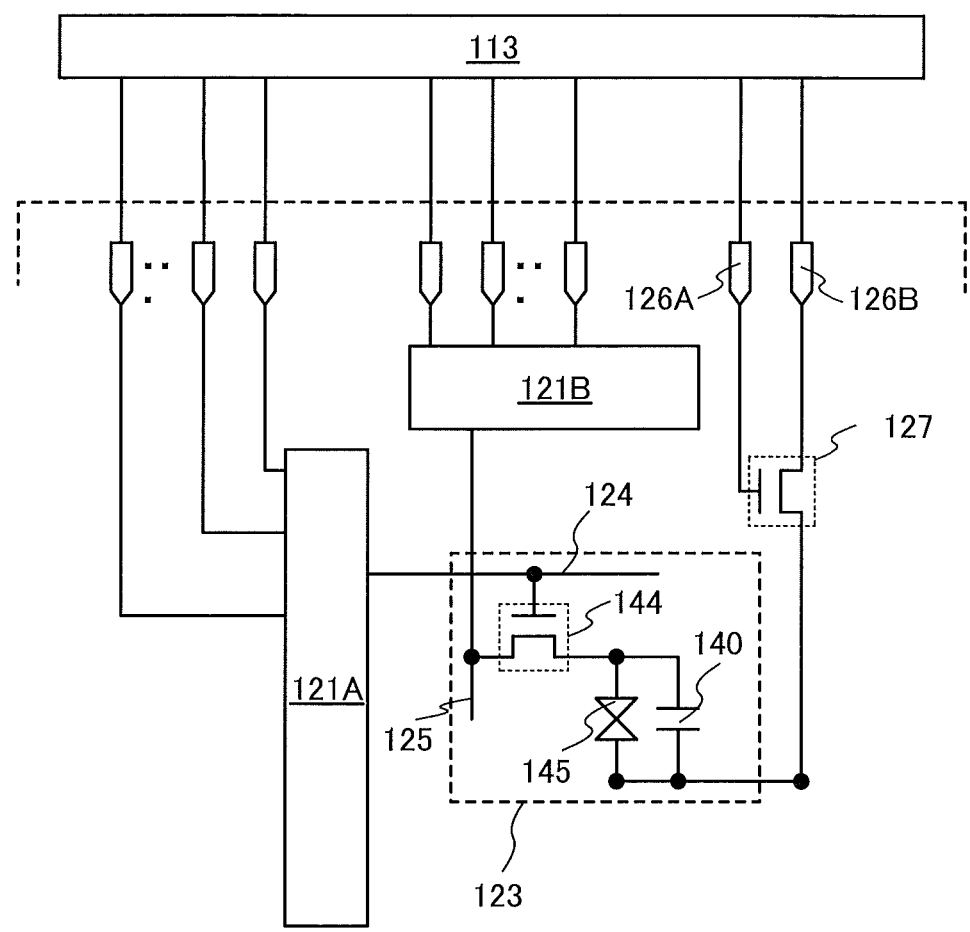
FIG. 6 is a diagram illustrating one aspect of a liquid crystal display device.

Moreover, a pixel 123 includes a transistor 144 functioning as a switching element, the capacitor 140 connected to the transistor 144, and a liquid crystal element 145 connected to the transistor 144 (see FIG. 6).

A transistor whose off-state current is reduced is preferably used as the transistor 144. When the transistor 144 is in an off state, electrical charges accumulated in the capacitor 140 and the liquid crystal element 145 which are connected to the transistor 144 whose off-state current is reduced are less likely to leak through the transistor 144, and a state where a signal is written before the transistor 144 is off can be held for a long time.

Note that for example, a transistor using an oxide semiconductor can be favorably used as the transistor 144. Further, in a manufacturing process of a transistor using an oxide semiconductor, it is preferable that an oxide semiconductor layer be purified by being subjected to heat treatment for dehydration or dehydrogenation so that impurities that are not main components of the oxide semiconductor layer are contained as little as possible. Heat treatment for compensating oxygen deficiency may be further performed after the heat treatment for dehydration or dehydrogenation. By purifying the oxide semiconductor layer, the concentration of hydrogen contained in the oxide semiconductor layer can be less than or equal to $5 \times 10^{19}$ atoms/cm$^3$, preferably less than or equal to $5 \times 10^{18}$ atoms/cm$^3$, more preferably less than or equal to $5 \times 10^{17}$ atoms/cm$^3$. By using a purified intrinsic oxide semiconductor layer, the off-state current of the transistor can be further reduced.

In this embodiment, liquid crystals are controlled by a vertical electric field that is generated by the pixel electrode over the first substrate and the common electrode provided on the second substrate which faces the first substrate.

The switching element 127 supplies the common potential $V_{com}$ to the common electrode 128 in accordance with a control signal output from the display control circuit 113. As the switching element 127, a transistor can be used. A gate electrode and one of a source electrode and a drain electrode of the transistor may be connected to the display control circuit 113, the common potential $V_{com}$ may be supplied from the display control circuit 113 to the one of the source electrode and the drain electrode through a terminal portion 126, and the other thereof may be connected to the common electrode 128. Note that the switching element 127 may be formed over the same substrate as the driver circuit portion 121 or the pixel portion 122. Alternatively, the switching element 127 may be formed over another substrate.

A transistor whose off-state current is reduced is used as the switching element 127, whereby a reduction over time in the voltage applied to both terminals of the liquid crystal element 145 can be suppressed. As the switching element 127, a transistor using an oxide semiconductor can be favorably used, for example.

In a common connection portion, a terminal connected to a source electrode or a drain electrode of the switching element 127 and the common electrode 128 are electrically connected to each other.

When a transistor that is one example of switching elements is used as the switching element 127, one of the source electrode and the drain electrode of the switching element 127 is connected to the other electrode of the capacitor 140 and the other electrode of the liquid crystal element 145 which are not connected to the transistor 144, and the other of the source electrode and the drain electrode of the switching element 127 is connected to a terminal 126B through the common connection portion. A gate electrode of the switching element 127 is connected to a terminal 126A.

Next, signals supplied to the pixels are described with reference to an equivalent circuit diagram of the liquid crystal display device illustrated in FIG. 6 and a timing chart shown in FIG. 7.

Figure 7:
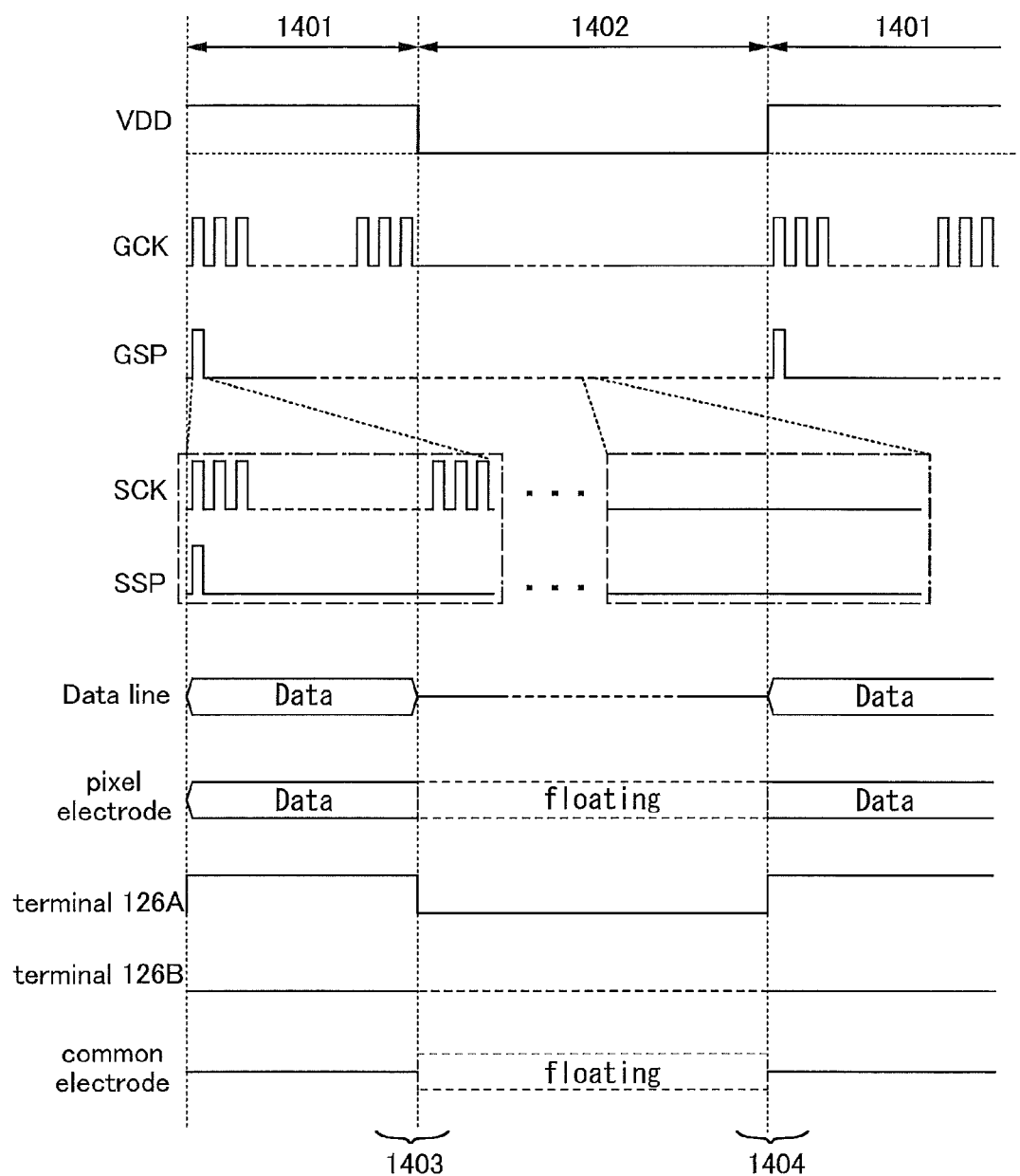
FIG. 7 is a timing chart illustrating one aspect of a method for driving a liquid crystal display device.

In FIG. 7, a clock signal GCK and a start pulse GSP which are supplied from the display control circuit 113 to the gate line driver circuit 121A are illustrated. In addition, a clock signal SCK and a start pulse SSP which are supplied from the display control circuit 113 to the source line driver circuit 121B are illustrated. To describe an output timing of the clock signal, the waveform of the clock signal is indicated with simple rectangular wave in FIG. 7.

In FIG. 7, the potential of a Data line (also referred to as a source line), the potential of the pixel electrode, the potential of the terminal 126A, the potential of the terminal 126B, and the potential of the common electrode are illustrated.

In FIG. 7, a period 1401 corresponds to a period during which image signals for displaying a moving image are written. In the period 1401, operation is performed so that the image signals and the common potential are supplied to the pixels in the pixel portion 122 and the common electrode.

A period 1402 corresponds to a period during which a still image is displayed. In the period 1402, the supply of the image signals to the pixels in the pixel portion 122 and the supply of the common potential to the common electrode are stopped. Note that each signal for stopping the operation of the driver circuit portion is supplied in the period 1402 illustrated in FIG. 7; however, it is preferable to prevent deterioration of a still image by writing image signals periodically in accordance with the length of the period 1402 and a refresh rate.

First, a timing chart in the period 1401 will be described. In the period 1401, a clock signal is supplied all the time as the clock signal GCK, and a pulse in accordance with a vertical synchronizing frequency is supplied as the start pulse GSP. In the period 1401, a clock signal is supplied all the time as the clock signal SCK, and a pulse in accordance with one gate selection period is supplied as the start pulse SSP.

In addition, the image signal Data is supplied to the pixel of each row through a source line 125, and the potential of the source line 125 is supplied to the pixel electrode in accordance with the potential of a gate line 124.

A potential at which the switching element 127 is turned on is supplied from the display control circuit 113 to the terminal 126A of the switching element 127, so that a common potential is supplied to the common electrode through the terminal 126B.

On the other hand, the period 1402 is a period during which a still image is displayed. Next, a timing chart in the period 1402 is described. In the period 1402, the supply of the clock signal GCK, the start pulse GSP, the clock signal SCK, and the start pulse SSP is stopped. In addition, the supply of the image signal Data to the source line 125 is stopped in the period 1402. In the period 1402 in which the supply of the clock signal GCK and the start pulse GSP is stopped, the transistor 144 is brought out of electrical conduction and the pixel electrode is put in a floating state.

A potential at which the switching element 127 is turned off is supplied from the display control circuit 113 to the terminal 126A of the switching element 127, so that the common electrode is put in a floating state.

In the period 1402, both electrodes of the liquid crystal element 145, i.e., the pixel electrode and the common electrode, are put in a floating state; thus, a still image can be displayed without the supply of another potential.

Further, the supply of a clock signal and a start pulse to the gate line driver circuit 121A and the source line driver circuit 121B is stopped, whereby power consumption can be reduced.

In particular, in the case where a transistor whose off-state current is reduced is used as the transistor 144 and the switching element 127, a reduction over time in the voltage applied to both terminals of the liquid crystal element 145 can be suppressed.

Figure 8A:
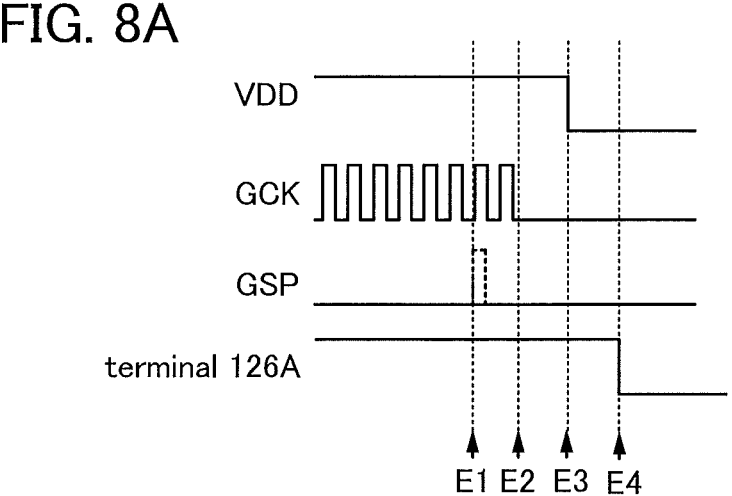
FIGS. 8A and 8B are timing charts each illustrating one aspect of a method for driving a liquid crystal display device.
Figure 8B:
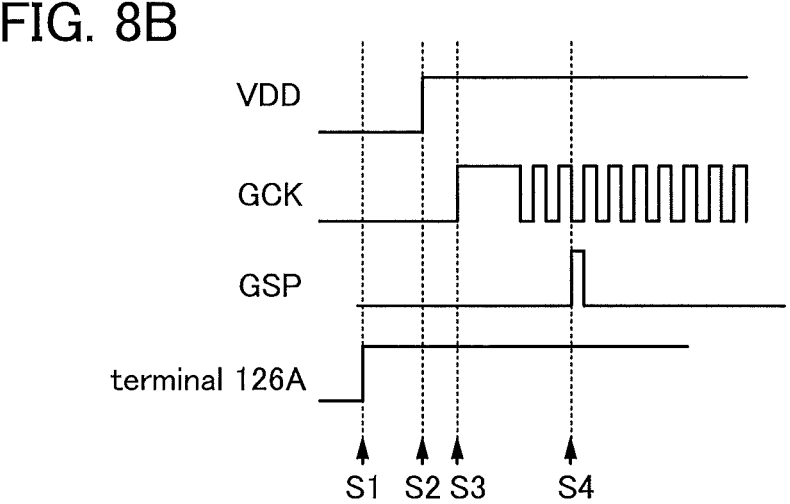

Next, operation of the display control circuit in a period during which a displayed image is switched to a still image from a moving image (a period 1403 in FIG. 7) and in a period during which a displayed image is switched to a moving image from the still image (a period 1404 in FIG. 7) is described with reference to FIGS. 8A and 8B. FIGS. 8A and 8B illustrate potentials of the high power supply potential $V_{DD}$, the clock signal (here, GCK), the start pulse signal (here, GSP) which are output from the display control circuit, and the potential of the terminal 126A.

The operation of the display control circuit in the period 1403 during which the displayed image is switched from the moving image to the still image is shown in FIG. 8A. The display control circuit stops the supply of the start pulse GSP (E1 in FIG. 8A, a first step). The supply of the start pulse GSP is stopped and then, the supply of a plurality of clock signals GCK is stopped after pulse output reaches the last stage of the shift register (E2 in FIG. 8A, a second step). Then, the power supply voltage is changed from the high power supply the potential $V_{dd}$ to the low power supply potential $V_{ss}$ (E3 in FIG. 8A, a third step). After that, the potential of the terminal 126A is changed to a potential at which the switching element 127 is turned off (E4 in FIG. 8A, a fourth step).

Through the above steps, the supply of signals to the driver circuit portion 121 can be stopped without causing malfunction of the driver circuit portion 121. The malfunction which occurs when a display image is switched from a moving image to a still image causes noise, and the noise is held as a still image; therefore, a liquid crystal display device that includes a display control circuit with fewer malfunctions can display a still image which is not deteriorated so much.

Next, the operation of the display control circuit in the period 1404 during which the displayed image is switched from the still image to the moving image is shown in FIG. 8B. The display control circuit sets the potential of the terminal 126A to a potential at which the switching element 127 is turned on (S1 in FIG. 8B, a first step). Then, a power supply voltage is changed from the low power supply potential $V_{ss}$ to the high power supply potential $V_{dd}$ (S2 in FIG. 8B, a second step). A high-level potential is applied as the clock signal GCK, after that a plurality of clock signals GCK is supplied (S3 in FIG. 8B, a third step). Next, the start pulse signal GSP is supplied (S4 in FIG. 8B, a fourth step).

Through the above steps, the supply of drive signals to the driver circuit portion 121 can be resumed without causing malfunction of the driver circuit portion 121. Potentials of the wirings are sequentially changed back to those at the time of displaying a moving image, whereby the driver circuit portion can be driven without malfunction.

Figure 9:
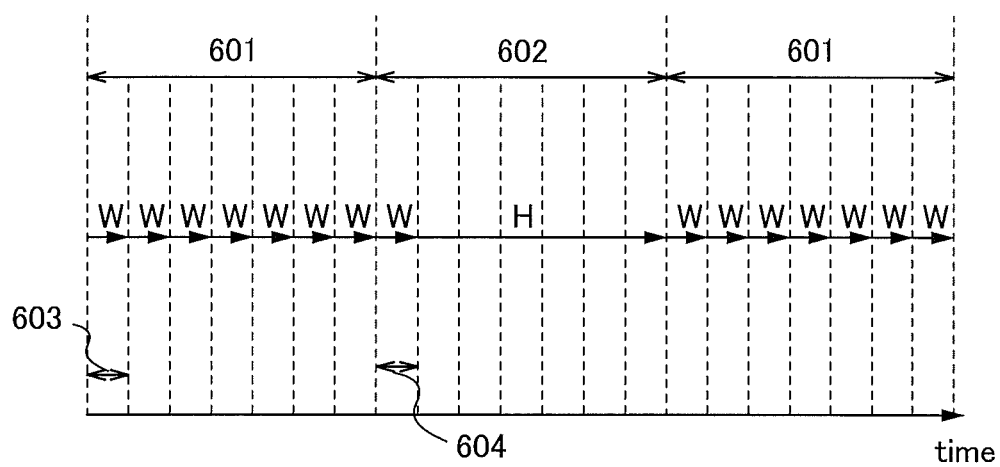
FIG. 9 is a diagram illustrating one aspect of a method for driving a liquid crystal display device.

FIG. 9 schematically shows writing frequency of image signals in each frame period in a period 601 in which a moving image is displayed or in a period 602 in which a still image is displayed. In FIG. 9, "W" indicates a period during which an image signal is written, and "H" indicates a period during which the image signal is held. In addition, a period 603 is one frame period in FIG. 9; however, the period 603 may be a different period.

In the structure of the liquid crystal display device of this embodiment, an image signal of a still image displayed in the period 602 is written in a period 604, and the image signal written in the period 604 is held in the other period in the period 602.

The liquid crystal display device described in this embodiment as an example can decrease writing frequency of an image signal in a period during which a still image is displayed. As a result, power consumption at the time of displaying a still image can be reduced.

In the case where a still image is displayed by rewriting the same image plural times, visible switching of the images may cause eyestrain of the human eye. Since the frequency of writing an image signal is reduced in the liquid crystal display device of this embodiment, eyestrain can be less severe.

Specifically, by using transistors whose off-state current is reduced for each pixel and a switching element of the common electrode, the liquid crystal display device of this embodiment can provide a long period (time) of holding a voltage in a storage capacitor. As a result, the frequency of writing image signals can be remarkably reduced, so that consumed power at the time of displaying a still image can be significantly reduced and eyestrain can be less severe.

Further, a liquid crystal display device capable of performing eye-friendly and natural white display can be manufactured by employing the structure described in Embodiment 1 in the display panel.

This embodiment can be implemented in an appropriate combination with the configurations described in the other embodiments.

Embodiment 3

A liquid crystal display device disclosed in this specification can be applied to a variety of electronic appliances. The liquid crystal display device disclosed in this specification performs white display by utilizing scattering of light and realizes image quality which is as favorable as that of paper; therefore, the liquid crystal display device is eye-friendly and can be favorably used as an electronic paper. An electronic paper can be used for electronic appliances of a variety of fields as long as they can display data. For example, an electronic paper can be applied to an e-book reader (electronic book), a poster, an advertisement in a vehicle such as a train, or displays of various cards such as a credit card.

In addition, the liquid crystal display device may be applied to a digital photo frame, a mobile phone (also referred to as a cellular phone or a mobile phone device), or the like. Examples of electronic appliances each including the liquid crystal display device described in the above embodiment are described.

Figure 10A:
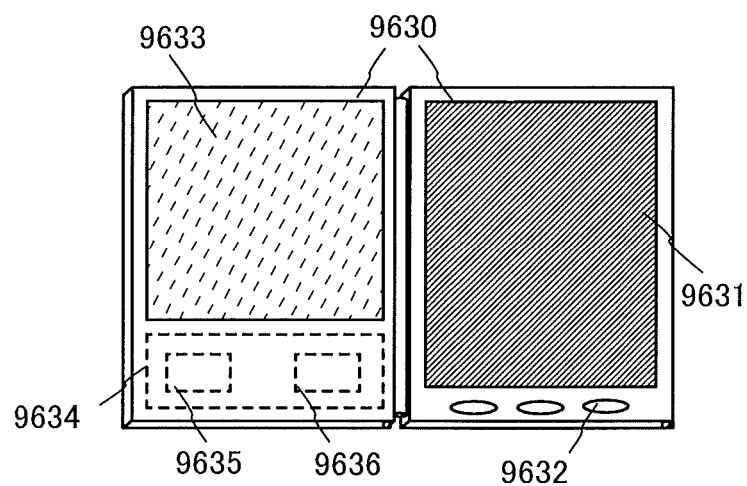
FIGS. 10A and 10B are diagrams illustrating an electronic appliance.

FIG. 10A illustrates an e-book reader (also referred to as an e-Book), which can include housings 9630, a display portion 9631, operation keys 9632, a solar cell 9633, and a charge and discharge control circuit 9634. The e-book reader illustrated in FIG. 10A has a function of displaying various kinds of data (e.g., a still image, a moving image, and a text image) on the display portion, a function of displaying a calendar, a date, the time, or the like on the display portion, a function of operating or editing the data displayed on the display portion, a function of controlling processing by various kinds of software (programs), and the like. Note that in FIG. 10A, a structure including a battery 9635 and a DCDC converter (hereinafter abbreviated as a converter) 9636 is illustrated as an example of the charge and discharge control circuit 9634. By applying the liquid crystal display device described in Embodiment 1 or 2 to the display portion 9631, an e-book reader capable of excellent white display can be realized.

When the structure illustrated in FIG. 10A is employed, power can be generated by the solar cell 9633 and charging of the battery 9635 can be performed, which is favorable. Since the solar cell 9633 can be provided on a space (a surface or a rear surface) of the housing 9630 as appropriate, the battery 9635 can be efficiently charged, which is preferable. When a lithium ion battery is used as the battery 9635, there is an advantage of downsizing or the like.

Figure 10B:
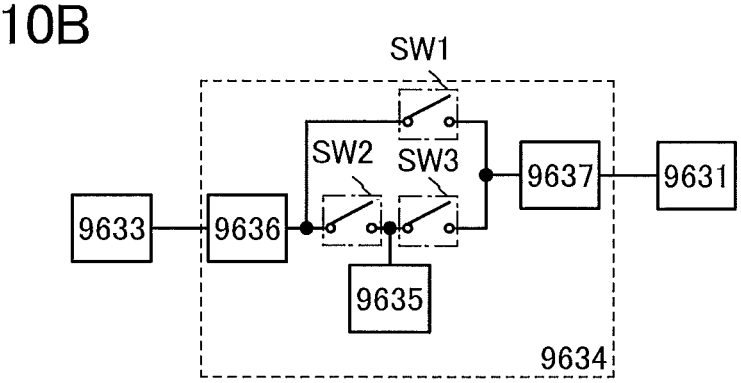

The configuration and the operation of the charge and discharge control circuit 9634 illustrated in FIG. 10A are described with reference to a block diagram in FIG. 10B. The solar cell 9633, the battery 9635, the converter 9636, a converter 9637, switches SW1 to SW3, and the display portion 9631 are shown in FIG. 10B, and the battery 9635, the converter 9636, the converter 9637, and the switches SW1 to SW3 correspond to the charge and discharge control circuit 9634.

First, an example of the operation in the case where power is generated by the solar cell 9633 using external light is described. The voltage of power generated by the solar cell is raised or lowered by the converter 9636 so that the power has a voltage for charging the battery 9635. Then, when the power from the solar cell 9633 is used for the operation of the display portion 9631, the switch SW1 is turned on and the voltage of the power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Next, an example of the operation in the case where power is not generated by the solar cell 9633 using external light is described. The voltage of power accumulated in the battery 9635 is raised or lowered by the converter 9637 by turning on the switch SW3. Then, power from the battery 9635 is used for the operation of the display portion 9631.

Note that although the solar cell 9633 is described as an example of a means for charge, charge of the battery 9635 may be performed with another means. In addition, a combination of the solar cell 9633 and another means for charge may be used.

Figure 11A:
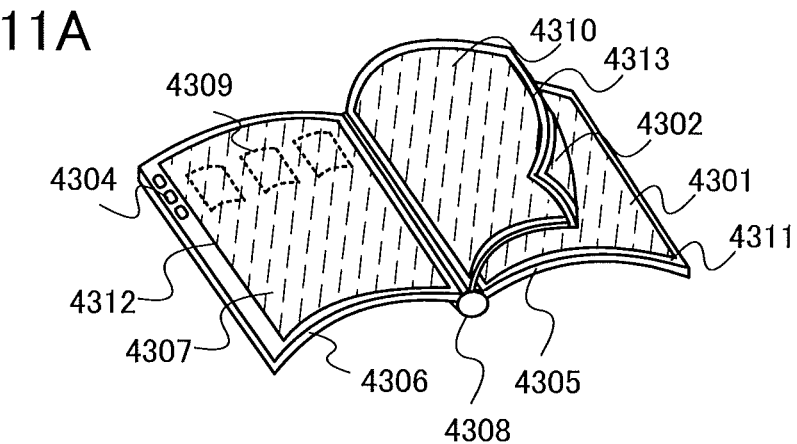
FIGS. 11A and 11B are diagrams illustrating an electronic appliance.
Figure 11B:
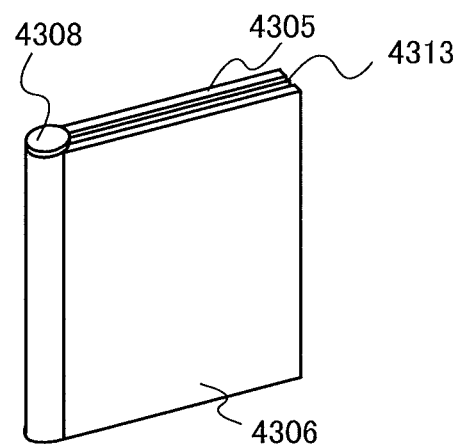

In FIGS. 11A and 11B, an example is illustrated in which a liquid crystal display device formed according to the above embodiment is applied to a flexible e-book reader. FIG. 11A illustrates an opened e-book reader and FIG. 11B illustrates a closed e-book reader. A liquid crystal display device formed according to the above embodiment can be used for a first display panel 4311, a second display panel 4312, and a third display panel 4313. By applying such a liquid crystal display device which performs white display by utilizing scattering of light, an e-book reader with high visibility can be realized. Accordingly, the e-book reader can be eye-friendly and eye-strain can be less severe.

A first housing 4305 has the first display panel 4311 including a first display portion 4301, and a second housing 4306 has the second display panel 4312 including an operation portion 4304 and a second display portion 4307. The third display panel 4313 is a dual display type panel and has a third display portion 4302 and a fourth display portion 4310. The third display panel 4313 is interposed between the first display panel 4311 and the second display panel 4312. The first housing 4305, the first display panel 4311, the third display panel 4313, the second display panel 4312, and the second housing 4306 are connected to each other with a binding portion 4308 in which a driver circuit is formed. The e-book reader of FIGS. 11A and 11B includes four display screens of the first display portion 4301, the second display portion 4307, the third display portion 4302, and the fourth display portion 4310.

Input operation to the e-book reader illustrated in FIGS. 11A and 11B is performed by touching the first display portion 4301 or the second display portion 4307 with a finger, an input pen, or the like or by operating the operation portion 4304. Note that a displayed button 4309 which is displayed on the second display portion 4307 is illustrated in FIG. 11A. Input can be performed by touching the displayed button 4309 with a finger or the like.

The first housing 4305, the first display panel 4311, the third display panel 4313, the second display panel 4312, and the second housing 4306 are flexible; and the flexibility of the e-book reader is high. Further, when a plastic substrate is used for each of the first housing 4305 and the second housing 4306, and a thin film is used for the third display panel 4313, a thin e-book reader can be obtained.

The third display panel 4313 is a dual display type panel including the third display portion 4302 and the fourth display portion 4310. For the third display panel 4313, display panels of a one-side emission type that are attached to each other may be used. Alternatively, the third display panel 4313 may be omitted so that the e-book reader can be just opened and folded.

This embodiment can be implemented in an appropriate combination with the structures described in the other embodiments.

Example 1

In this example, effects of the inclination angle $\theta_M$ of a depression and a projection of a pixel electrode layer on the reflectance (where the reflectance of a standard white plate is 100%) and contrast of a display device are described.

First, manufacturing steps of a liquid crystal display device which was manufactured in this example is described. In this example, a silicon oxide film as an interlayer film was formed over a substrate provided with a transistor. A photosensitive acrylic resin film as a resin interlayer film for forming a structural body was formed to a thickness of 4.5 μm over the silicon oxide film. Then, a depression and a projection were formed on the acrylic resin film through a photolithography process. After that, a 300-nm-thick aluminum film was formed as a pixel electrode layer. The substrate at this stage was a first substrate. In this example, four conditions were set where the average values of the inclination angle $\theta_M$ of the formed depression and projection were 7.2°, 14.5°, 22.8°, and 45.5° by adjustment of conditions of the photolithography process performed on the acrylic resin film. Note that in all of the four conditions, one mask was used for forming the depression and the projection in order that arrangement of the depression and the projection in one pixel be not varied between the conditions.

As a second substrate which faced the first substrate, a substrate which was provided with a polarizing plate and a 110-nm-thick light-transmitting conductive film which was formed using indium tin oxide containing silicon oxide and served as a common electrode was used. The first substrate and the second substrate were disposed so as to face each other with a liquid crystal layer interposed therebetween, whereby the liquid crystal display device of this example was manufactured.

In FIGS. 12A1, 12A2, 12B1, 12B2, 12C1, 12C2, 12D1, and 12D2, plan optical micrographs and cross-sectional STEM images of the pixel electrode layers of the manufactured liquid crystal display devices are shown. FIGS. 12A1 and 12A2 show the plan and cross-sectional photographs of the pixel electrode layer in which the average value of the inclination angle $\theta_M$ is 7.2°. FIGS. 12B1 and 12B2 show the plan and cross-sectional photographs of the pixel electrode layer in which the average value of the inclination angle $\theta_M$ is 14.5°. FIGS. 12C1 and 12C2 show the plan and cross-sectional photographs of the pixel electrode layer in which the average value of the inclination angle $\theta_M$ is 22.8°. FIGS. 12D1 and 12D2 show the plan and cross-sectional photographs of the pixel electrode layer in which the average value of the inclination angle $\theta_M$ is 45.5°.

Figure 13:
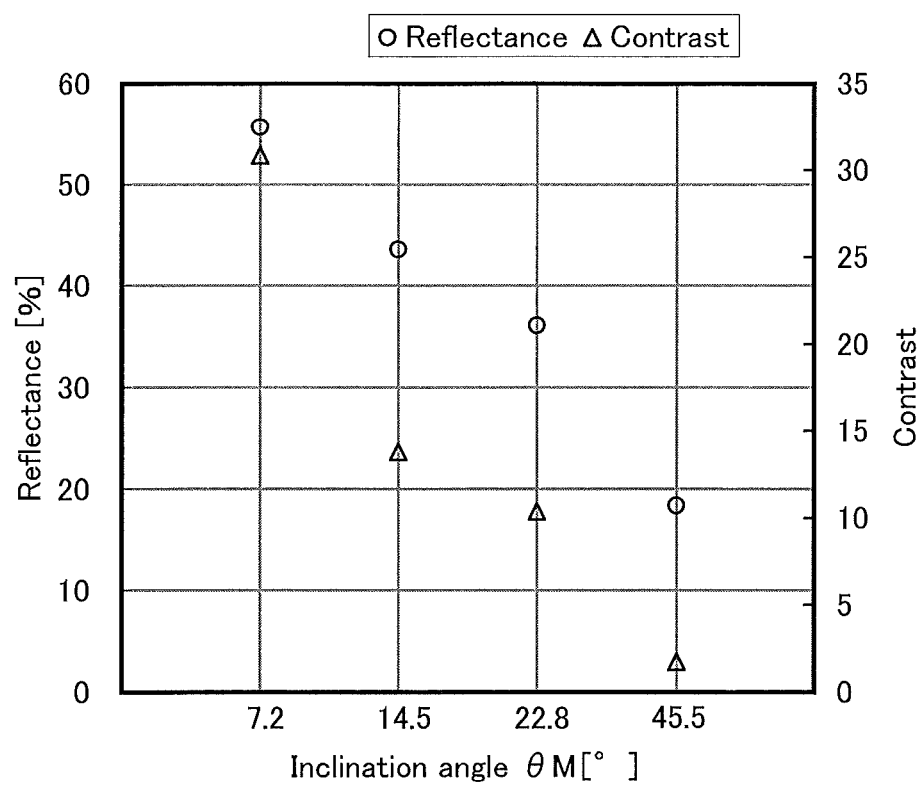
FIG. 13 is a graph showing reflectance and contrast of each liquid crystal display device in Example 1.

Comparison of reflectance and contrast between the manufactured liquid crystal display devices is shown in FIG. 13. FIG. 13 shows that the reflectance, contrast, and visibility were low in the case where the average value of the inclination angle $\theta_M$ was 45.5° and that the reflectance and contrast were high and favorable display was performed in the case where the average values of the inclination angle $\theta_M$ were 7.2°, 14.5°, and 22.8°. Further, in the case where the average value of the inclination angle $\theta_M$ was 7.2°, display color was a color similar to aluminum, which was used as the pixel electrode layer. On the other hand, in the case where the average values of the inclination angle $\theta_M$ were 14.5° and 22.8°, excellent white display was realized.

As described above, white display can be efficiently performed by using a pixel electrode layer whose surface has a depression and a projection. Further, white display with high reflectance, contrast, and visibility can be performed by setting the average value of the inclination angle $\theta_M$ to greater than or equal to 5° and less than or equal to 25°, preferably greater than or equal to 8° and less than or equal to 22°, further preferably greater than 10° and less than or equal to 18°.

Example 2

In this example, effects brought about by adjustment of optical characteristics are described. Optical characteristics were adjusted in such a manner that a wavelength range in which transmittance in a visible light range of a polarizing plate provided with a λ/4 retardation plate was decreased was compensated by a peak wavelength range in which transmittance of a common electrode layer (ITO) was increased.

Figure 14A:
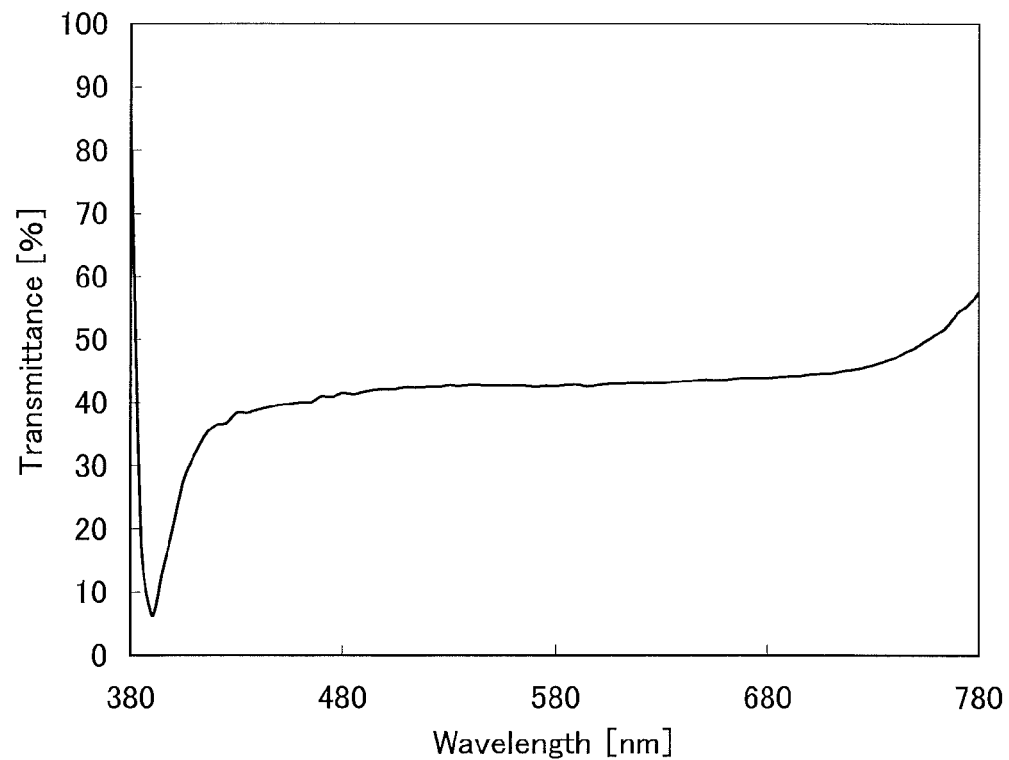
FIGS. 14A and 14B are graphs showing transmittance of a polarizing plate and transmittance of a common electrode layer.
Figure 14B:
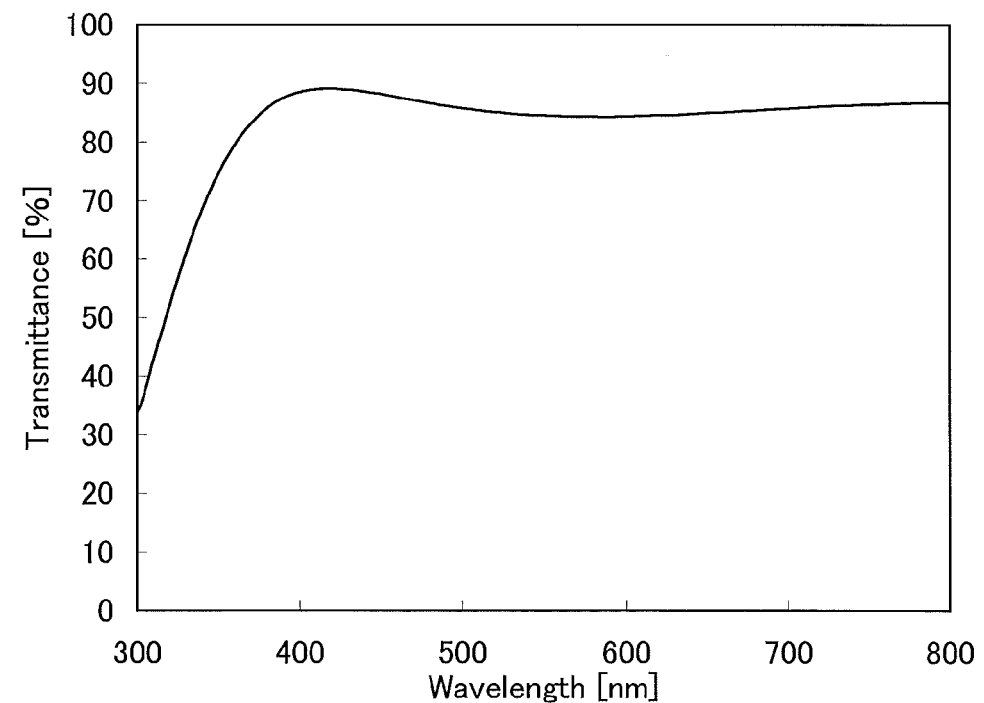

FIG. 14A shows the transmittance of the polarizing plate provided with the λ/4 retardation plate, and FIG. 14B shows the transmittance of the common electrode layer (ITO). In each of FIGS. 14A and 14B, the horizontal axis indicates a wavelength [nm] and the vertical axis indicates transmittance [%].

As shown in FIG. 14A, the transmittance of the polarizing plate provided with the 214 retardation plate is decreased at a wavelength of about 400 nm to 450 nm; on the other hand, as shown in FIG. 14B, it can be observed that the transmittance of the common electrode layer (ITO) is high at a wavelength of about 400 nm to 450 nm.

Visible light components which are insufficient due to the polarizing plate at a wavelength of about 400 nm to 450 nm can be supplemented when part of the wavelength range in which the transmittance in the visible light range of the polarizing plate provided with the 214 retardation plate is decreased overlaps with part of the peak wavelength range in which the transmittance in the visible light range of the common electrode layer (ITO) is increased. Therefore, optical characteristics in the visible light range become favorable and excellent white display is realized; moreover, generation of a color tone due to the polarizing plate provided with the 214 retardation plate can be suppressed.

Example 3

In this example, effects of the inclination angle $\theta_M$ of a depression and a projection of a pixel electrode layer on the reflectance (where the reflectance of a standard white plate is 100%) and contrast of a display device are described.

First, manufacturing steps of a liquid crystal display device which was manufactured in this example is described. In this example, a silicon oxide film as an interlayer film was formed over a substrate provided with a transistor. A photosensitive acrylic resin film as a resin interlayer film for forming a structural body was formed to a thickness of 4.5 μm over the silicon oxide film. Then, a depression and a projection were formed on the acrylic resin film through a photolithography process. After that, a 300-nm-thick aluminum film was formed as a pixel electrode layer. The substrate at this stage was a first substrate. In this example, two conditions were set where the average values of the inclination angle $\theta_M$ of the formed depression and projection were 11.5° and 12.0° by adjustment of conditions of the photolithography process performed on the acrylic resin film. Note that in both of the two conditions, one mask was used for forming the depression and the projection in order that arrangement of the depression and the projection in one pixel be not varied between the conditions.

Further, a silicon oxide film was formed in a manner similar to that of the case of the photosensitive acrylic resin film, and a polyimide resin film as a resin interlayer film for forming a structural body was then formed to a thickness of 3.0 μm over the silicon oxide film. Then, a depression and a projection were formed on the polyimide resin film through a photolithography process. After that, a 300-nm-thick aluminum film was formed as a pixel electrode layer. The substrate at this stage was a first substrate. In this example, two conditions were set where the average values of the inclination angle $\theta_M$ of the formed depression and projection were 11.5° and 12.0° by adjustment of conditions of the photolithography process performed on the polyimide resin film. Note that in both of the two conditions, one mask was used for forming the depression and the projection in order that arrangement of the depression and the projection in one pixel be not varied between the conditions.

As a second substrate which faced the first substrate, a substrate which was provided with a polarizing plate and a 90-nm-thick light-transmitting conductive film which was formed using indium tin oxide containing silicon oxide and served as a common electrode was used. The first substrate and the second substrate were disposed so as to face each other with a liquid crystal layer interposed therebetween, whereby the liquid crystal display device of this example was manufactured.

In FIGS. 15A1, 15A2, 15B1, 15B2, 15C1, 15C2, 15D1, and 15D2, plan optical micrographs and cross-sectional STEM images of the pixel electrode layers of the manufactured liquid crystal display devices are shown. FIGS. 15A1 and 15A2 show the plan and cross-sectional photographs of the pixel electrode layer in which the resin interlayer film is the photosensitive acrylic resin film and the average value of the inclination angle $\theta_M$ is 11.5°. FIGS. 15B1 and 15B2 show the plan and cross-sectional photographs of the pixel electrode layer in which the resin interlayer film is the photosensitive acrylic resin film and the average value of the inclination angle $\theta_M$ is 12.0°. FIGS. 15C1 and 15C2 show the plan and cross-sectional photographs of the pixel electrode layer in which the resin interlayer film is the polyimide resin film and the average value of the inclination angle $\theta_M$ is 11.5°. FIGS. 15D1 and 15D2 show the plan and cross-sectional photographs of the pixel electrode layer in which the resin interlayer film is the polyimide resin film and the average value of the inclination angle $\theta_M$ is 12.0°.

In this example, in the case of the pixel electrode layer in which the average value of the inclination angle $\theta_M$ was about 12°, white display was not prevented by a reduction in the scattering effect of reflected light which was brought about by the depression and the projection of the pixel electrode layer; brightness of emitted light was not made insufficient by a reduction in efficiency of extraction of the reflected light. Accordingly, excellent white display could be performed.

Figure 16:
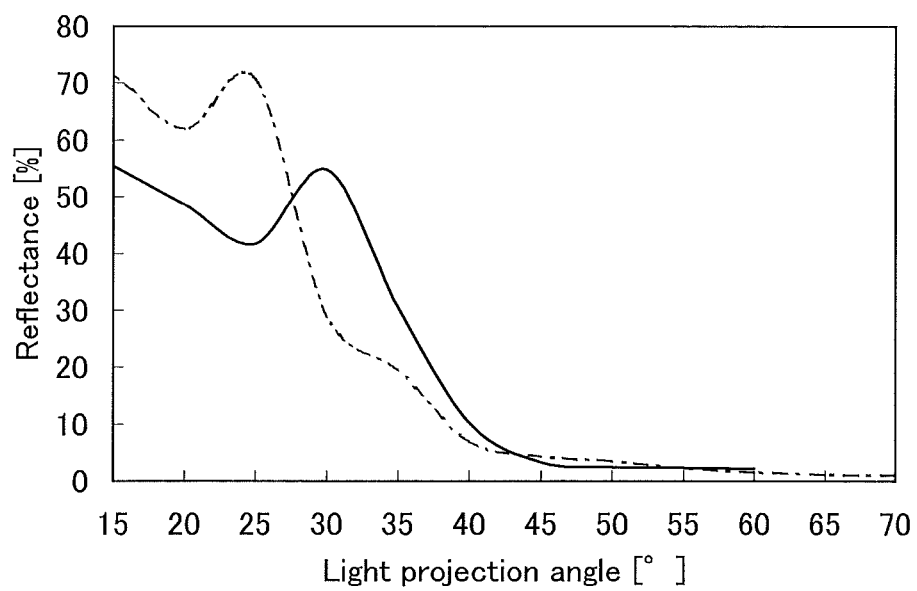
FIG. 16 is a graph showing reflectance of each liquid crystal display device in Example 3.
Figure 19:
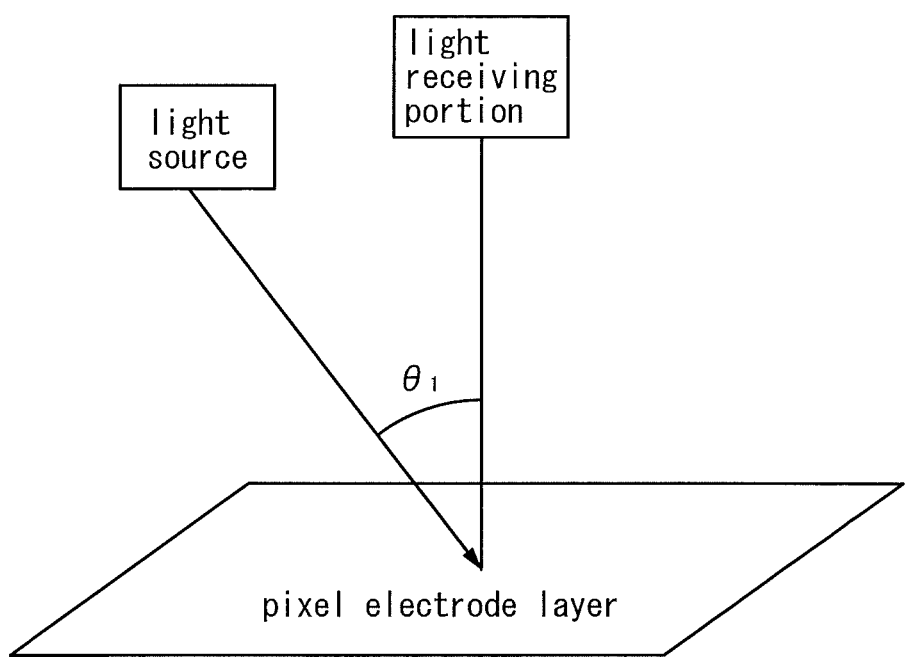
FIG. 19 is a diagram explaining a light projection angle.

Further, FIG. 16 shows a change in the reflectance with respect to a light projection angle of the liquid crystal display device in which the resin interlayer film is the photosensitive acrylic resin film or the polyimide resin film. In the graph, the horizontal axis and the vertical axis indicate a light projection angle [°] and reflectance [%], respectively, and the solid line and the dotted line show the characteristics of the photosensitive acrylic resin film and the characteristics of the polyimide resin film, respectively. Here, the light projection angle means an angle $\theta_1$ formed between a light source (a halogen lamp) and a light receiving portion as illustrated in FIG. 19. As shown in FIG. 16, when the light projection angles were about 25° to 30°, standard light projection angles at which humans watch things, high reflectance was obtained and favorable display was performed.

Figure 17:
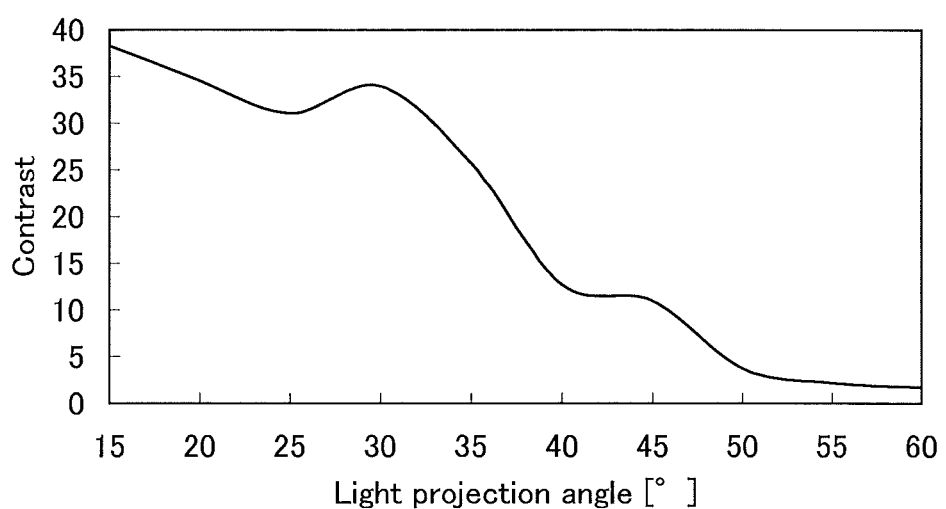
FIG. 17 is a graph showing contrast of each liquid crystal display device in Example 3.

Furthermore, a change in the contrast with respect to the light projection angle of the liquid crystal display device in which the resin interlayer film is the photosensitive acrylic resin film is shown in FIG. 17. In the graph, the horizontal axis and the vertical axis indicate a light projection angle [°] and contrast, respectively. As shown in FIG. 17, when the light projection angles were about 25° to 30°, standard angles at which humans watch things, high contrast was obtained and favorable display was performed.

As described above, white display can be efficiently performed by using a pixel electrode layer whose surface has a depression and a projection. Further, white display with high reflectance, contrast, and visibility can be performed by setting the average value of the inclination angle $\theta_M$ to greater than or equal to 5° and less than or equal to 25°, preferably greater than or equal to 8° and less than or equal to 22°, further preferably greater than 10° and less than or equal to 18°, still preferably greater than or equal to 11° and less than or equal to 13°.

This application is based on Japanese Patent Application serial No. 2010-117511 filed with Japan Patent Office on May 21, 2010, the entire contents of which are hereby incorporated by reference.

The invention claimed is:

1. A liquid crystal display device comprising:
a liquid crystal layer between a first substrate and a second substrate;
a structural body between the first substrate and the liquid crystal layer;
a reflective electrode layer between the structural body and the liquid crystal layer;
a planarizing film between the reflective electrode layer and the liquid crystal layer;
a pixel electrode between the planarizing film and the liquid crystal layer;
a light-transmitting electrode layer between the second substrate and the liquid crystal layer; and
a polarizing plate on a side of the second substrate opposite to a liquid crystal layer side,
wherein the reflective electrode layer has a surface having a depression and a projection,
wherein a peak wavelength range in which transmittance of the light-transmitting electrode layer is increased is included in a wavelength range in which transmittance in a visible light range of the polarizing plate is decreased, and
wherein the pixel electrode and the light-transmitting electrode layer are formed using similar material with each other.

2. The liquid crystal display device according to claim 1, wherein an average value of an inclination angle of the depression and the projection is greater than or equal to 8° and less than or equal to 22°.

3. The liquid crystal display device according to claim 1, wherein an average value of a gap of the depression and the projection is greater than 10 μm and less than 30 μm.

4. The liquid crystal display device according to claim 1, wherein the depression and the projection are arranged in such a manner that 60% or more of gaps of depressions and projections in one pixel are greater than 10 μm and less than 30 μm.

5. The liquid crystal display device according to claim 1, wherein an intensity ratio between light emitted through the polarizing plate in part of the wavelength range in which the transmittance in the visible light range of the polarizing plate is decreased and light emitted through the polarizing plate in part of a peak wavelength range in which the transmittance in the visible light range of the polarizing plate is increased is greater than or equal to 0.8 and less than or equal to 1.2.

6. The liquid crystal display device according to claim 1, wherein the reflective electrode layer includes a region in which the depression and the projection are arranged in point symmetry or line symmetry.

7. A liquid crystal display device comprising:
a liquid crystal layer between a first substrate and a second substrate;
a structural body between the first substrate and the liquid crystal layer;
a reflective electrode layer between the structural body and the liquid crystal layer;
a planarizing film between the reflective electrode layer and the liquid crystal layer;
a pixel electrode between the planarizing film and the liquid crystal layer;
a light-transmitting electrode layer between the second substrate and the liquid crystal layer; and
a polarizing plate on a side of the second substrate opposite to a liquid crystal layer side,
wherein the reflective electrode layer has a surface having a depression and a projection,
wherein a thickness of the light-transmitting electrode layer is set so that a peak wavelength range in which transmittance of the light-transmitting electrode layer is increased is included in a wavelength range in which transmittance in a visible light range of the polarizing plate is decreased, and wherein the pixel electrode and the light-transmitting electrode layer are formed using similar material with each other.

8. The liquid crystal display device according to claim 7, wherein an average value of an inclination angle of the depression and the projection is greater than or equal to 8° and less than or equal to 22°.

9. The liquid crystal display device according to claim 7, wherein an average value of a gap of the depression and the projection is greater than 10 µm and less than 30 µm.

10. The liquid crystal display device according to claim 7, wherein the depression and the projection are arranged in such a manner that 60% or more of gaps of depressions and projections in one pixel are greater than 10 µm and less than 30 µm.

11. The liquid crystal display device according to claim 7, wherein an intensity ratio between light emitted through the polarizing plate in part of the wavelength range in which the transmittance in the visible light range of the polarizing plate is decreased and light emitted through the polarizing plate in part of a peak wavelength range in which the transmittance in the visible light range of the polarizing plate is increased is greater than or equal to 0.8 and less than or equal to 1.2.

12. The liquid crystal display device according to claim 7, wherein the reflective electrode layer includes a region in which the depression and the projection are arranged in point symmetry or line symmetry.

13. A liquid crystal display device comprising:
a reflective electrode layer over a structural body;
a planarizing film over the reflective electrode layer;
a pixel electrode over the planarizing film;
a liquid crystal layer over the pixel electrode;
a light-transmitting electrode layer over the liquid crystal layer; and
a polarizing plate over the light-transmitting electrode layer,
wherein the reflective electrode layer has a surface having a depression and a projection,
wherein a peak wavelength range in which transmittance of the light-transmitting electrode layer is increased is included in a wavelength range in which transmittance in a visible light range of the polarizing plate is decreased, and
wherein the pixel electrode and the light-transmitting electrode layer are formed using similar material with each other.

14. The liquid crystal display device according to claim 13, wherein an average value of an inclination angle of the depression and the projection is greater than or equal to 8° and less than or equal to 22°.

15. The liquid crystal display device according to claim 13, wherein an average value of a gap of the depression and the projection is greater than 10 µm and less than 30 µm.

16. The liquid crystal display device according to claim 13, wherein the depression and the projection are arranged in such a manner that 60% or more of gaps of depressions and projections in one pixel are greater than 10 µm and less than 30 µm.

17. The liquid crystal display device according to claim 13, wherein an intensity ratio between light emitted through the polarizing plate in part of the wavelength range in which the transmittance in the visible light range of the polarizing plate is decreased and light emitted through the polarizing plate in part of a peak wavelength range in which the transmittance in the visible light range of the polarizing plate is increased is greater than or equal to 0.8 and less than or equal to 1.2.

18. The liquid crystal display device according to claim 13, wherein the reflective electrode layer includes a region in which the depression and the projection are arranged in point symmetry or line symmetry.

19. A liquid crystal display device comprising:
a reflective electrode layer over a structural body;
a planarizing film over the reflective electrode layer;
a pixel electrode over the planarizing film;
a liquid crystal layer over the pixel electrode;
a light-transmitting electrode layer over the liquid crystal layer; and
a polarizing plate over the light-transmitting electrode layer,
wherein the reflective electrode layer has a surface having a depression and a projection,
wherein a thickness of the light-transmitting electrode layer is set so that a peak wavelength range in which transmittance of the light-transmitting electrode layer is increased is included in a wavelength range in which transmittance in a visible light range of the polarizing plate is decreased, and
wherein the pixel electrode and the light-transmitting electrode layer are formed using similar material with each other.

20. The liquid crystal display device according to claim 19, wherein an average value of an inclination angle of the depression and the projection is greater than or equal to 8° and less than or equal to 22°.

21. The liquid crystal display device according to claim 19, wherein an average value of a gap of the depression and the projection is greater than 10 µm and less than 30 µm.

22. The liquid crystal display device according to claim 19, wherein the depression and the projection are arranged in such a manner that 60% or more of gaps of depressions and projections in one pixel are greater than 10 µm and less than 30 µm.

23. The liquid crystal display device according to claim 19, wherein an intensity ratio between light emitted through the polarizing plate in part of the wavelength range in which the transmittance in the visible light range of the polarizing plate is decreased and light emitted through the polarizing plate in part of a peak wavelength range in which the transmittance in the visible light range of the polarizing plate is increased is greater than or equal to 0.8 and less than or equal to 1.2.

24. The liquid crystal display device according to claim 19, wherein the reflective electrode layer includes a region in which the depression and the projection are arranged in point symmetry or line symmetry.

25. The liquid crystal display device according to claim 1, wherein the structural body and the planarizing film are formed using similar material with each other.

26. The liquid crystal display device according to claim 7, wherein the structural body and the planarizing film are formed using similar material with each other.

27. The liquid crystal display device according to claim 13, wherein the structural body and the planarizing film are formed using similar material with each other.

28. The liquid crystal display device according to claim 19, wherein the structural body and the planarizing film are formed using similar material with each other.

* * * * *